United States Patent
Guo et al.

(10) Patent No.: US 12,491,266 B2
(45) Date of Patent: Dec. 9, 2025

(54) RECOMBINANT AAV VECTORS FOR TREATING GLUTARIC ACIDURIA TYPE I

(71) Applicant: SHANGHAI VITALGEN BIOPHARMA CO., LTD., Shanghai (CN)

(72) Inventors: Lu Guo, Beijing (CN); Xi Zhu, Shanghai (CN); Shin-Shay Tian, Shanghai (CN); Xiaoping Zhao, Shanghai (CN)

(73) Assignee: SHANGHAI VITALGEN BIOPHARMA CO., LTD., Shanghai (CN)

( * ) Notice: Subject to any disclaimer, the term of this patent is extended or adjusted under 35 U.S.C. 154(b) by 0 days.

(21) Appl. No.: 18/948,694

(22) Filed: Nov. 15, 2024

(65) Prior Publication Data

US 2025/0064982 A1  Feb. 27, 2025

Related U.S. Application Data

(63) Continuation of application No. PCT/CN2023/094298, filed on May 15, 2023.

(30) Foreign Application Priority Data

May 16, 2022 (WO) ............... PCT/CN2022/093084

(51) Int. Cl.
*A61K 48/00* (2006.01)
*C12N 9/02* (2006.01)
*C12N 15/86* (2006.01)

(52) U.S. Cl.
CPC .......... *A61K 48/0058* (2013.01); *C12N 9/001* (2013.01); *C12N 15/86* (2013.01); *C12Y 103/08006* (2015.07); *C12N 2750/14122* (2013.01); *C12N 2750/14143* (2013.01)

(58) Field of Classification Search
CPC  C12Y 103/08006; C12N 9/001; C12N 15/86; A61K 48/0058
See application file for complete search history.

(56) References Cited

U.S. PATENT DOCUMENTS

| | | | |
|---|---|---|---|
| 2014/0271550 | A1 | 9/2014 | Rabinowitz et al. |
| 2021/0388343 | A1* | 12/2021 | Lisowski et al. |
| 2022/0193259 | A1* | 6/2022 | Meyer et al. |

FOREIGN PATENT DOCUMENTS

| | | |
|---|---|---|
| CN | 1331305 A | 1/2002 |
| CN | 112955174 A | 6/2021 |
| CN | 113755524 A | 12/2021 |
| CN | 114277057 | 4/2022 |
| CN | 114277057 A | 4/2022 |
| CN | 115461066 A | 12/2022 |
| WO | 2018/035311 | 2/2018 |
| WO | 2020-014209 A1 | 1/2020 |
| WO | 2020/106916 | 5/2020 |
| WO | 2021-021661 A1 | 2/2021 |
| WO | 2021/076911 | 4/2021 |
| WO | 2021-107005 A1 | 6/2021 |
| WO | 2021-221995 A1 | 11/2021 |
| WO | 2024/223843 A1 | 10/2024 |

OTHER PUBLICATIONS

Koponen Sanna, Kokki Emmi, Tamminen Toni, Ylä-Herttuala Seppo., AAV2 and AAV9 tropism and transgene expression in the mouse eye and major tissues after intravitreal and subretinal delivery, 2023,Front. Drug Deliv. 3:1148795. doi: 10.3389/fddev.2023.1148795 (Year: 2023).*
Shaul O. How introns enhance gene expression. Int J Biochem Cell Biol. 2017;91(Pt B):145-155. doi:10.1016/j.biocel.2017.06.016 (Year: 2017).*
International Search Report issued Sep. 8, 2023, in International Patent Application No. PCT/CN2023/094298 (5 pages).
S.I. Goodman, et al. "RecName: Full=Glutaryl-CoA dehydrogenase, mitochondrial; Short=GCD; Flags: Precursor" UniProtKB/Swiss-Prot: Q92947.1, Sep. 29, 2021.
A. Mateu-Bosch, et al. "GCDH Gene Therapy Ameliorates Glutaric Aciduria Type I Phenotype in Mice," ESGCT 27th Annual Congress in collaboration with SETGyc Barcelona, Spain, Oct. 25, 2019 (1 page).
S.I. Goodman,et al. "Cloning of glutaryl-CoA dehydrogenase cDNA , and expression of wild type and mutant enzymes in *Escherichia coli*," Human Molecular Genetics, vol. 4, No. 9, Sep. 1, 1998, pp. 1493-1498.
J.W. Gao, et al. "Hepatocyte-targeted HFE and TFR2 control hepcidin expression in mice," Blood, vol. 115, No. 16, Apr. 22, 2010, pp. 3374-3381.
Chinese Office Action issued Aug. 2, 2025, in Chinese Patent Application No. 202380040833.8 (with attached English Translation).
Search Report issued Jul. 30, 2025, in Chinese Patent Application No. 202380040833. 8 (English Translation Only).
N. Kalnine, "*Homo sapiens* glutaryl-Coenzyme A dehydrogenase mRNA, complete cds", (GenBank), Accession: BT006706.1 (May 13, 2003).
A. Mateu-Bosch, "GCDH Gene Therapy Ameliorates Glutaric Aciduria Type I Phenotype in Mice," (Human Gene Therapy), vol. 30, No. 11, Nov. 7, 2019.

(Continued)

*Primary Examiner* — Maria G Leavitt
*Assistant Examiner* — Kodye Lee Abbott
(74) *Attorney, Agent, or Firm* — Merchant & Gould P.C.; Daniel J. Pereira

(57) ABSTRACT

The present disclosure relates to codon-optimized sequences coding for hGCDH polypeptide and recombinant adeno-associated virus (rAAV) vectors comprising one of said sequences under the control of a promoter component. Also provided herein are viral particles comprising the rAAV vector, a pharmaceutical composition comprising the rAAV vector or the viral particles, and uses thereof in treating Glutaric aciduria type I (GA-I).

12 Claims, 10 Drawing Sheets

Specification includes a Sequence Listing.

(56) References Cited

OTHER PUBLICATIONS

Lu Guo et al., "Treatment of Glutaric Aciduria Type I (Ga-I) via Intracerebroventricular Delivery of GCDH," Fundamental Research, vol. 2 (2022), pp. 836-842.
Anna Mateu-Bosch et al., "Systemic Delivery of AAV-GCDH Ameliorates HLD-induced Phenotype in a Glutaric Aciduria Type I Mouse Model," Molecular Therapy Methods & Clinical Development, vol. 32, Sep. 2024 (12 pages).
Johannes Zschocke, et al., "Mutation Analysis in Glutaric Aciduria Type I," J. Med Genet, 2000; 37: 177-181.
Liu Yutang, "Genetic Engineering of Animal Cells and Transgenic Animals," Animal Cell Engineering, ISBN 7-81076-558-2, (2004)—with attached English translation.
Search Report issued Oct. 11, 2025, in Chinese Patent Application No. 202380040833.8 (with English Translation Only).
Search Office Action issued Oct. 11, 2025, in Chinese Patent Application No. 202380040833.8 (with English Translation Only).

* cited by examiner

SEQUENCE LISTING

```
Sequence total quantity: 33
SEQ ID NO: 1           moltype = DNA   length = 584
FEATURE                Location/Qualifiers
misc_feature           1..584
                       note = P0
source                 1..584
                       mol_type = other DNA
                       organism = synthetic construct
SEQUENCE: 1
gacattgatt attgactagt tattaatagt aatcaattac ggggtcatta gttcatagcc  60
catatatgga gttccgcgtt acataactta cggtaaatgg cccgcctggc tgaccgccca  120
acgaccccg cccattgacg tcaataatga cgtatgttcc catagtaacg ccaataggga  180
ctttccattg acgtcaatgg gtggagtatt tacggtaaac tgcccacttg gcagtacatc  240
aagtgtatca tatgccaagt acgccccta ttgacgtcaa tgacggtaaa tggcccgcct  300
ggcattatgc ccagtacatg accttatggg actttcctac ttggcagtac atctacgtat  360
tagtcatcgc tattaccatg gtgatgcggt tttggcagta catcaatggg cgtggatagc  420
ggtttgactc acggggattt ccaagtctcc accccattga cgtcaatggg agtttgtttt  480
ggcaccaaaa tcaacgggac tttccaaaat gtcgtaacaa ctccgcccca ttgacgcaaa  540
tgggcggtag gcgtgtacgg tgggaggtct atataagcag agct              584
```

```
SEQ ID NO: 2               moltype = DNA  length = 583
FEATURE                    Location/Qualifiers
misc_feature               1..583
                           note = P1
source                     1..583
                           mol_type = other DNA
                           organism = synthetic construct
SEQUENCE: 2
cgttacataa cttacggtaa atgcccgcc tggctgaccg cccaacgacc cccgcccatt    60
gacgtcaata atgacgtatg ttcccatagt aacgccaata gggactttcc attgacgtca   120
atgggtggag tatttacggt aaactgccca cttggcagta catcaagtgt atcatatgcc   180
aagtacgccc cctattgacg tcaatgacgg taaatggccc gcctggcatt atgcccagta   240
catgacctta tgggactttc ctacttggca gtacatctac gtattagtca tcgctattac   300
catggtcgag gtgagcccca cgttctgctt cactctcccc atctcccccc ctccccacc   360
cccaattttg tatttattta tttttaatt attttgtgca gcgatggggg cgggggggg    420
ggggggcgc gcgccaggcg gggcggggcg gggcgagggg cggggcgggg cgaggcggag   480
aggtgcggcg gcagccaatc agagcggcgc gctccgaaag tttccttta tggcgaggcg   540
gcggcggcgg cggccctata aaagcgaag cgcgcggcgg gcg                     583

SEQ ID NO: 3               moltype = DNA  length = 680
FEATURE                    Location/Qualifiers
misc_feature               1..680
                           note = P2
source                     1..680
                           mol_type = other DNA
                           organism = synthetic construct
SEQUENCE: 3
cgttacataa cttacggtaa atgcccgcc tggctgaccg cccaacgacc cccgcccatt    60
gacgtcaata atgacgtatg ttcccatagt aacgccaata gggactttcc attgacgtca   120
atgggtggag tatttacggt aaactgccca cttggcagta catcaagtgt atcatatgcc   180
aagtacgccc cctattgacg tcaatgacgg taaatggccc gcctggcatt atgcccagta   240
catgacctta tgggactttc ctacttggca gtacatctac gtattagtca tcgctattac   300
catggtcgag gtgagcccca cgttctgctt cactctcccc atctcccccc ctccccacc   360
cccaattttg tatttattta tttttaatt attttgtgca gcgatggggg cgggggggg    420
ggggggcgc gcgccaggcg gggcggggcg gggcgagggg cggggcgggg cgaggcggag   480
aggtgcggcg gcagccaatc agagcggcgc gctccgaaag tttccttta tggcgaggcg   540
gcggcggcgg cggccctata aaagcgaag cgcgcggcgg gcgtaagtt tagtcttttt   600
gtctttatt tcaggtcccg gatccggtgg tggtgcaaat caaagaactg ctcctcagtg   660
gatgttgcct ttacttctag                                              680

SEQ ID NO: 4               moltype = DNA  length = 674
FEATURE                    Location/Qualifiers
misc_feature               1..674
                           note = P3
source                     1..674
                           mol_type = other DNA
                           organism = synthetic construct
SEQUENCE: 4
cgttacataa cttacggtaa atgcccgcc tggctgaccg cccaacgacc cccgcccatt    60
gacgtcaata atgacgtatg ttcccatagt aacgccaata gggactttcc attgacgtca   120
atgggtggag tatttacggt aaactgccca cttggcagta catcaagtgt atcatatgcc   180
aagtacgccc cctattgacg tcaatgacgg taaatggccc gcctggcatt atgcccagta   240
catgacctta tgggactttc ctacttggca gtacatctac gtattagtca tcgctattac   300
catggtcgag gtgagcccca cgttctgctt cactctcccc atctcccccc ctccccacc   360
cccaattttg tatttattta tttttaatt attttgtgca gcgatggggg cgggggggg    420
ggggggcgc gcgccaggcg gggcggggcg gggcgagggg cggggcgggg cgaggcggag   480
aggtgcggcg gcagccaatc agagcggcgc gctccgaaag tttccttta tggcgaggcg   540
gcggcggcgg cggccctata aaagcgaag cgcgcggcgg cggtcagtg tggggtcggg   600
agtgtggagg gaaggaggga ggaactgggg gtttagggac tttccggggt gactttccg   660
ttctgtgctt gcag                                                    674

SEQ ID NO: 5               moltype = DNA  length = 322
FEATURE                    Location/Qualifiers
misc_feature               1..322
                           note = P4
source                     1..322
                           mol_type = other DNA
                           organism = synthetic construct
SEQUENCE: 5
ggctccggtg cccgtcagtg ggcagagcgc acatcgccca cagtcccga gaagttgggg    60
ggaggggtcg gcaattgaac gggtgcctag agaaggtggc gcggggtaaa ctgggaaagt   120
gatgtcgtgt actggctccg ccttttccc gagggtgggg gagaaccgta tataagtgca   180
gtagtcgccg tgaacgttct ttttcgcaac gggtttgccg ccagaacaca ggtcagtgtg   240
gggtcgggag tgtgagggga aggagggagg gaactgggggt ttagggactt tccggggtga   300
ctttcccgtt ctgtgcttgc ag                                           322

SEQ ID NO: 6               moltype = DNA  length = 539
FEATURE                    Location/Qualifiers
```

```
misc_feature            1..539
                        note = P5
source                  1..539
                        mol_type = other DNA
                        organism = synthetic construct
SEQUENCE: 6
ggctccggtg cccgtcagtg ggcagagcgc acatcgccca cagtccccga gaagttgggg    60
ggaggggtcg gcaattgaac gggtgcctag agaaggtggc gcggggtaaa ctgggaaagt   120
gatgtcgtgt actggctccg cctttttccc gagggtgggg gagaaccgta tataagtgca   180
gtagtcgccg tgaacgttct ttttcgcaac gggtttgccg ccagaacaca ggtaaggacc   240
tctggtcgca ccgtgtgtct gctgcccctg ttcagctgtc tgtctgccgc aggtggactc   300
tgtcccagaa tccgagagct gcccgagcgg ggtggcaggg tcgtggccag gtcagaggc    360
actaaggcag tgagtgcgct gtgcctgcgg ggccggagaa aagtcacctg atcagtctcg   420
cttgcagctc gcactagccg ggggcgaca tgggtaggg tgatgagggt                 480
ccgagaaggg agggcacagt gatcttgcgg actggaccgg ggcgaattcc ccttcccag     539

SEQ ID NO: 7            moltype = DNA  length = 372
FEATURE                 Location/Qualifiers
misc_feature            1..372
                        note = P6
source                  1..372
                        mol_type = other DNA
                        organism = synthetic construct
SEQUENCE: 7
ggctccggtg cccgtcagtg ggcagagcgc acatcgccca cagtccccga gaagttgggg    60
ggaggggtcg gcaattgaac gggtgcctag agaaggtggc gcggggtaaa ctgggaaagt   120
gatgtcgtgt actggctccg cctttttccc gagggtgggg gagaaccgta tataagtgca   180
gtagtcgccg tgaacgttct ttttcgcaac gggtttgccg ccagaacaca ggtgggcggg   240
ctggtgggtc cctgagact gctcctccgc ctggagccat agccacccca cctcaaggcc    300
cctctgtcct tggggctggg gcttcctgtg gcctaggcct gggcctgaat ttgggcactg   360
gtcccttgc ag                                                         372

SEQ ID NO: 8            moltype = DNA  length = 630
FEATURE                 Location/Qualifiers
misc_feature            1..630
                        note = P7
source                  1..630
                        mol_type = other DNA
                        organism = synthetic construct
SEQUENCE: 8
ggctccggtg cccgtcagtg ggcagagcgc acatcgccca cagtccccga gaagttgggg    60
ggaggggtcg gcaattgaac gggtgcctag agaaggtggc gcggggtaaa ctgggaaagt   120
gatgtcgtgt actggctccg cctttttccc gagggtgggg gagaaccgta tataagtgca   180
gtagtcgccg tgaacgttct ttttcgcaac gggtttgccg ccagaacaca ggtcagtgtg   240
gggtcggag tgtggaggga aggagggagg aactgggggt ttagggactt tccggggtga    300
cttttcccgtt ctgtgcttgc aggtaaggac ctctggtcgc accgtgtgtc tgctgcccct   360
gttcagctgt ctgtctgccg caggtcagact ctgtcccaga atccgagagc tgcccgagcg   420
gggtggcagg gtcgtggcca gggtcagagg cactaaggca gtgagtgcgc tgtgcctgcg    480
gggccggaga aaagtcacct gatcagtctc gcttgcagct cgcactagcc gggggcgac    540
atgggtgttg ggggtaggg ctgatgaggg tccgagaagg gagggcacag tgatcttgcg    600
gactggaccg aggcgaattc cccttcccag                                     630

SEQ ID NO: 9            moltype = DNA  length = 460
FEATURE                 Location/Qualifiers
misc_feature            1..460
                        note = P8
source                  1..460
                        mol_type = other DNA
                        organism = synthetic construct
SEQUENCE: 9
ggctccggtg cccgtcagtg ggcagagcgc acatcgccca cagtccccga gaagttgggg    60
ggaggggtcg gcaattgaac gggtgcctag agaaggtggc gcggggtaaa ctgggaaagt   120
gatgtcgtgt actggctccg cctttttccc gagggtgggg gagaaccgta tataagtgca   180
gtagtcgccg tgaacgttct ttttcgcaac gggtttgccg ccagaacaca gggtggcggg   240
gcgacgctgc cttcgcccg tgccccgctc cgccgccgcc tcgcgccgcc cgccccggct    300
ctgactgacc gcgttactcc cacaggtgag cgggcgggac ggcccttctc ctccgggctg   360
taattagctg agcaagaggt aagggtttaa gggatggttg gttggtgggg tattaatgtt   420
taattacctg gagcacctgc ctgaaatcac ttttttttcag                         460

SEQ ID NO: 10           moltype = DNA  length = 1317
FEATURE                 Location/Qualifiers
source                  1..1317
                        mol_type = genomic DNA
                        organism = Homo sapiens
SEQUENCE: 10
atggccctga gggcgtctc cgtgcggctg ctgagccgcg gacccggcct gcacgtcctt     60
cgcacgtggg tctcgtcggc ggcgcagacc gagaaggcg ggagaacaca gagccaactg    120
gctaagtcct cgcgtcccga gtttgactgg caggacccg tggtgctgga ggagcagctg    180
accacagatg agatcctcat cagggacacc ttccgcacct actgccagga gagactcatg   240
```

```
cctcgcatcc tgttggccaa tcgcaacgaa gttttcatc gggagatcat ttcggagatg   300
ggggagttgg gtgtgctggg ccccaccatc aaaggatatg gctgtgctgg ggtttcgtct   360
gtggcctatg ggctcctggc ccgagagctg gagcgggtgg acagtggcta caggtcggcg   420
atgagtgtcc agtcctccct cgtcatgcac cctatctatg cctatggcag cgaggaacag   480
cggcagaagt acctgcccca gctggcaaag ggggagctcc tgggctgctt cgggctcaca   540
gagcccaaca gcggaagtga ccccagcagc atggagacca gagcccacta caactcatcc   600
aacaagagct acaccctcaa tgggaccaag acctggatca cgaactcgcc tatgccgat    660
ctgtttgtag tgtgggctcg gtgtgaagat ggctgcattc ggggcttcct gctggagaag   720
gggatgcggg gtctctcggc ccccaggatc cagggcaagt tctcgctgcg ggcctcagcc   780
acaggcatga tcatcatgga cggtggag gtgccagagg agaatgtgct ccctggtgca   840
tccagcctgg ggggtccctt cggctgcctg aacaacgccc ggtacggcat cgcgtggggc   900
gtgcttggag cttcggagtt ctgcttgcac acagcccggc agtacgccct cgacaggatg   960
cagtttggtg tcccactggc caggaaccag ctgattcaga agaagctggc agacatgctc  1020
actgagatta ccctgggcct tcacgcctgc ctgcagctcg gccgcttgaa ggaccaggac  1080
aaggctgccc cgagatggt ttctctgctg aagaggaata actgtgggaa agccctggac  1140
atcgcccgcc aggcccgaga catgctgggg gggaatggga tttctgacga gtatcacgtg  1200
atccggcacg ccatgaacct ggaggccgtg aacacctacg aaggtacaca tgacattcac  1260
gccctgatcc ttgggagagc tatcacggga atccaggcgt tcacgccag caagtaa      1317
```

```
SEQ ID NO: 11          moltype = DNA   length = 1317
FEATURE                Location/Qualifiers
misc_feature           1..1317
                       note = C1
source                 1..1317
                       mol_type = other DNA
                       organism = synthetic construct
SEQUENCE: 11
atggccctga gaggcgtgtc cgtcagactg ctgagcagag ccctggcct gcatgtgctc    60
agaacctggg tcagcagcgc tgctcaaaca gaaaaggggg gcagaacaca agccaactg   120
gctaagagca gcagacctga atttcgattgg caagacccc tggtcctgga agaacagctg   180
acaacagacg agattctgat tagagacaca ttcagaacat attgccaaga aagactgatg   240
cctagaatcc tgctggccaa cagaaatgaa gtgtttcatc gggaaatcat tagcgagatg   300
ggcgagctgg gcgtgctggg ccccaccatt aagggctacg ctgtgctgg ggtgtcctcc   360
gtggcctatg gcctcctggc tagagaactc gaaagagtcg atacggcta cagaagcgct   420
atgagcgtgc agagcagcct ggtgatgcat cctatctata cttatggcag cgaagagcag   480
agacaaaagt atctgcctca gctggctaag ggcgagctgc tcggctgctt cgggctgaca   540
gaacccaata gcgggtccga tcctagcagc atggagacaa gagctcatta taatagcagc   600
aacaagagct atacccctgaa cgggacaaaaa acatggatca caaatagccc tatggctgac   660
ctgtttgtgg tgtgggcag atgtgaggat ggctgtatca gaggctttct gctggagaag   720
ggcatgcggg ggctgtccgc tcctagaatc caaggcaaat ttagcctgag agctagcgct   780
acaggcatga ttattatgga cggcgtcgag gtgcctgagg aaaatgtgct gcctggcgct   840
agcagcctgg gcgggccttt cggctgcctg aataacgcta gatatggcat cgcctggggg   900
gtgctgggcg cctccgagtt ttgtctgcac acagctggcc agtatgccct ggacagaatg   960
caattcgggg tgcccctggc tagaaatcag ctgattcaaa agaaactggc tgacatgctg  1020
acagaaatta cactcggcct ccatgcctgt ctgcagctgg gcagactcaa agatcaagat  1080
aaggctgccc ctgaaatggt cagcctgctc aaaagaaaca attgcggcaa agctctggat  1140
atcgctagac aagctagaga tatgctcggc ggcaacggaa ttagcgacga gtatcatgtg  1200
atcagacacg ctatgaatct ggaagccgtg aacacctatg aaggcacaca cgacatccac  1260
gctctgatcc tcgggagagc tatcaccggc attcaagcct tcacagctag caagtaa     1317
```

```
SEQ ID NO: 12          moltype = DNA   length = 1317
FEATURE                Location/Qualifiers
misc_feature           1..1317
                       note = C2
source                 1..1317
                       mol_type = other DNA
                       organism = synthetic construct
SEQUENCE: 12
atggctctga gagggtgag cgtcagactg ctgagcagag ccctggcct gcatgtgctg    60
agaacatggg tgtccagcgc tgctcagaca gagaaggggg gcagaacaca gagccaactg   120
gccaagagca gcagacctga atttgactgg caagaccccc tggtcctgga ggagcagctg   180
accacagatg agatcctgat cagagacacc ttcagaacct actgccaaga gagactgatg   240
cctagaatcc tgctggccaa cagaaatgag gtcttccaca gagaaatcat tagcgagatg   300
ggggagctgg ggtgctgg cccctacaatc aagggctatg gctgtgctgg gtgagcagc   360
gtggcctatg gcctgctggc tagagagctg gagagagtgg acagcgggta cagaagcgct   420
atgagcgtgc agagcagcct ggtcatgcac cccatctatg cctatggcag cgaggagcag   480
agacagaaat atctccctca gctggccaag ggggagctgc tgggctgctt tggcctcaca   540
gagcccaata gcggcagcga ccctagcagc atggagacaa gagctcacta caacagcagc   600
aacaagagct acaccctgaa tgggaccaag acatggatca caaacagccc catggctgat   660
ctctttgtgg tctggctag atgtgaggat ggctgtatca gaggctttct cctggagaag   720
ggcatgagag gctgagcgc tcctagaatc caaggcaaat tcagcctcag agcttccgcc   780
accgggatga tcatcatgga tggggtggag gtccctgagg agaatgtgct gcctgggct   840
agctcccctg ggggccctt tggctgtctc aataatgcta gatatggcat tgcctgggg   900
gtgctgggcg ccagcgagtt ctgcctgcat acagcaggcc aatatgccct ggacagaatg   960
cagtttgggg tgcccctggc tagaaatcag ctgattcaga agaagctggc tgacatgctg  1020
acagagatca cactgggcct gcatgcctgt ctgcagctgg ggagactgaa ggaccaagat  1080
aaggctgccc ctgagatggt gagcctgctg aagagaaata actgtgggaa agctctggac  1140
attgctagac aagctagaga catgctgggg ggcaatggca tctccgatga gtaccatgtc  1200
atcagacatg ccatgaacct ggaggctgtg aacacctatg agggcacaca tgacatccat  1260
```

```
gccctgatcc tgggcagagc catcaccggc atccaagcct tcacagctag caagtga      1317

SEQ ID NO: 13           moltype = DNA  length = 1317
FEATURE                 Location/Qualifiers
misc_feature            1..1317
                        note = C3
source                  1..1317
                        mol_type = other DNA
                        organism = synthetic construct
SEQUENCE: 13
atggccctga gaggcgtctc cgtgaggctg ctgagcagag acctggcct gcatgtcctt     60
agaacgtggg tctcgtcggc ggcgcagacc gagaaaggcg ggagaacaca gagccaactg   120
gctaagtcct cgcgtcctga gtttgactgg caggacccgc tggtgctgga ggagcagctg   180
accacagatg agatcctcat cagggacacc ttcagaacct actgccagga gagactgctg   240
cctagaatcc tgttggccaa tagaaatgaa gttttttcata gggagatcat ttcggagatg   300
ggggagttgg gtgtgctggg ccccaccatc aaaggatatg ctgtgctgg ggtttcgtct    360
gtggcctatg ggctcctggc ccgagagctg gagagggtgg acagtggcta caggtcggcg   420
atgagtgtcc agtcctccct tgtcatgcac cctatctatg cctatggcag tgaggaacag   480
aggcagaagt acctgcccca gctggccaag ggggagctcc tgggctgctt tgggctcaca   540
gagcccaact ctggaagtga ccccagcagc atggagacca gagcccactg caactcatcc   600
aacaagagct acaccctcaa tgggaccaag acctggatca cgaactcgcc tatggccgat   660
ctgttttgtag tgtgggctag gtgtgaagat ggctgcatta gggcttcct gctggagaag   720
gggatgaggg gtctctcggc ccccaggatc cagggcaagt tctcgctgag ggcctcagcc   780
acaggcatga tcatcatgga tggtgtggag gtgccagagg agaatgtgct ccctggtgca   840
tccagcctgg gggtccctt tggctgcctg aacaatgcca gtatggcat tgcgtggggc    900
gtgcttggag cttcggagtt ctgcttgcac acagccaggc agtatgccct tgacaggagg   960
cagtttggtg tcccactggc caggaaccag ctgattcaga agaagctggc agacatgctc   1020
actgagatta ccctgggcct tcatgcctgc ctgcagcttg gcagattgaa ggaccaggac   1080
aaggctgccc ctgagatggt ttctctgctg aagaggaata actgtgggaa agccctggac   1140
attgccagac aggcccgaga catgctgggg gggaatggca tttctgatga gtatcatgtg   1200
atcaggcatg ccatgaacct ggaggccgtg aacacctatg aaggtacaca tgacattcat   1260
gccctgatcc ttgggagagc tatcacggga atccaggcgt tcacggccag caagtaa      1317

SEQ ID NO: 14           moltype = DNA  length = 1317
FEATURE                 Location/Qualifiers
misc_feature            1..1317
                        note = C4
source                  1..1317
                        mol_type = other DNA
                        organism = synthetic construct
SEQUENCE: 14
atggccctga gaggcgtctc cgtgcggctg ctgagccgcg acccggcct gcacgtcctt     60
cgcacgtggg tctcgtcggc ggcgcagacc gagaaaggcg ggagaacaca gagccaactg   120
gctaagtcct cgaggcccga gtttgactgg caggaccccc tggtgctgga ggagcagctg   180
acaaccgatg agatcctgat cagggatacc ttcagaacct actgtcagga ggctgatg    240
cccaggatcc tgctggccaa cagaaacgag gtgttccaca gagagatcat cagcgagatg   300
ggcgagctgg gcgtgctggg ccctacaatc aagggctacg ctgcgccgg cgtgagcagc    360
gttgcctacg gcctgctggc cagggagctg gagagagtgg attccggcta cagaagcgcc   420
atgagcgtgc agagctccct ggtcatgcac cctatctacg cctacggcag cgaggagcag   480
agacagaagt acctgcccca gctggccaaa ggcgagctgc tgggctgctt cggcctgaca   540
gagcctaatt ccggctccga ccccagctcc atggagacca gagcccacta caatagctcc   600
aataagagct acacactgaa cggcacaaag acctggatca caaacagccc catggccgac   660
ctgtttgtgg tgtgggccag gtgtgaggat ggctgtatca ggggctttct gctggagaag   720
ggcatgagag gcctgtccgc ccccaggatc cagggcaagt ttagcctgag agccagcgcc   780
accggcatga tcatcatgga tggcgtggag gtgcccgagg agaacgtgct gcctggcgcc   840
agcagcctgg gcgaccttt tggctgcctg aacaatgcca gatacggcat cgcctggggc    900
gtgctgggag cctctgagtt ctgcctgcac accgccaggc agtacgccct ggataggatg   960
cagtttggcg tgcccctggc cagaaaccag ctgatccaga agaagctggc cgacatgctg   1020
accgagatca cactgggcct gcacgcctgc ctgcagctgg gaaggctgaa ggatcaggac   1080
aaggccgccc ccgagatggt gtccctgctg aagagaaata ttgtggcaa ggccctggac   1140
atcgccagac aggccagaga tatgctgggc ggcaatggca tcagcgatga gtaccacgtg   1200
atcaggcacg ccatgaacct ggaggccgtg aacacctacg agggcaccca cgacatccac   1260
gccctgatcc tgggcagggc catcaccggc atccaggcct taccgccag caagtaa      1317

SEQ ID NO: 15           moltype = DNA  length = 1317
FEATURE                 Location/Qualifiers
misc_feature            1..1317
                        note = C5
source                  1..1317
                        mol_type = other DNA
                        organism = synthetic construct
SEQUENCE: 15
atggccctga gaggcgtctc cgtgcggctg ctgagccgcg acccggcct gcacgtcctt     60
cgcacgtggg tctcgtcggc ggcgcagacc gagaaaggcg ggagaacaca gagccaactg   120
gctaagtcct cgagcccga gttcgactgg caggaccctc ttgtgctgga agagcaactg   180
acaacagatg agatcctgat cagagacacc ttcagaacct actgccagga gagactgatg   240
cccagaatcc tgctgccaa cagaaacgag gtgttccaca gagagatcat cagcgagatg   300
ggcgagctgg gcgtgctggg ccctacaatt aaaggatatg ctgcgccgg agtgagcagc    360
gtggcttatg gacttctggc tagagagctg gagagagtgg acagcggcta tagaagcgcc   420
```

```
atgagcgtgc agagcagcct ggtgatgcat cccatttatg cctacggcag cgaggagcaa  480
agacagaagt acctgcccca gctgccaag ggcgagctgc tgggatgttt tggacttaca  540
gaacccaaca gcggaagcga ccccagcagc atggaaacca gagctcatta taacagcagc  600
aacaagagct acaccctgaa cggcaccaag acctggatca ccaacagccc catggccgac  660
cttttgtgg tgtgggctag atgcgaggac ggctgtatta gaggctttct gctggaaaag  720
ggcatgagag gcctgagcgc ccctagaatt caaggcaaat ttagcctgag agccagcgcc  780
accggaatga ttatcatgga cggcgtggag gtgcccgagg agaatgtgct gcctggagct  840
agcagcctgg gaggccctt tggatgtctg aataatgcca gatacggcat cgcctggggc  900
gtgctgggag ctagcgagtt ttgtctgcat acagccagac agtacgccct ggacagaatg  960
cagttcggcg tgcccttgc tagaaatcag ctgatccaga agaagctggc cgacatgctg  1020
accgagatca ccctgggact tcacgcctgt ctgcaactgg gaagactgaa agatcaggac  1080
aaggccgccc ccgaaatggt gtctctgctt aaaagaaaca actgcggcaa ggccctggac  1140
atcgccagac aagctagaga tatgctgggc ggcaatggca ttagcgatga atatcacgtg  1200
attagacacg ccatgaacct ggaggccgtg aacacctatg aggcacaca tgacatccac  1260
gccctgattc tgggaagagc cattaccggc atccaggcct ttaccgccag caagtaa    1317

SEQ ID NO: 16            moltype = DNA  length = 1317
FEATURE                  Location/Qualifiers
misc_feature             1..1317
                         note = C6
source                   1..1317
                         mol_type = other DNA
                         organism = synthetic construct
SEQUENCE: 16
atggccctga gaggcgtctc cgtgcggctg ctgagccgcg acccggcct gcacgtcctt  60
cgcacgtggg tctcgtcggc ggcgcagacc gagaaaggcg ggagaacaca gagccaactg  120
gctaagtcct cgcgtcccga gtttgactgg caggacccgc tggtgctgga ggagcagctg  180
accacagatg agatcctcat cagggacacc ttccgcacct actgccagga gagactcatg  240
cctcgcatcc tgttggccaa tcgcaacgaa gttttcatc gggagatcat ttcggagatg  300
ggggagttgg gtgtgctggg ccccaccatc aaaggatatg gctgtgctgg ggtttcgtct  360
gtggcctatg gctcctggc ccgagagctg gagcgggtgg acagtggcta caggtcggcg  420
atgagtgtcc agtcctccct cgtcatgcac cctatctatg cctatggcag cgaggaacag  480
cggcagaagt acctgcccca gctggccaag ggggagctcc tgggctgctt tgggctcaca  540
gagccaact ctggaagtga ccccagcagc atggaaccgc gagcccacta caactcatcc  600
aacaagagct acaccctcaa tgggaccaag acctggatca cgaactcgcc tatggccgat  660
ctgtttgtag tgtgggctag gtgtgaagat ggctcaatta gggcttcct gctgagaag  720
gggatgaggg gtctctcggc cccaggatc agggcaagt tctcgctgag gcctcagcc  780
acaggcatga tcatcatgga tggtgtggag gtgccagagg agaatgtgct ccctggtgca  840
tccagcctgg ggtccctt tggctgcctg aacaatgcca ggtatggcat tgcgtgggc  900
gtgcttggag cttcggagtt ctgcttgcac acagccaggc agtatgccct tgacaggatg  960
cagtttggtg tcccactggc caggaaccag ctgattcaga agaagctggc agacatgctc  1020
actgagatta ccctgggcct tcatgcctgc ctgcagcttg gcagattgaa ggaccaggac  1080
aaggctgccc ctgagatggt ttctctgctg aagagaaata actgtgggaa agccctggac  1140
attgccagac aggcccgaga catgctgggg gggaatggga tttctgatga gtatcatgtg  1200
atcaggcatg ccatgaacct ggaggccgtg aacacctatg aagtacaca tgacattcat  1260
gccctgatcc ttgggagagc tatcacggga atccaggcgt cacggccag caagtaa  1317

SEQ ID NO: 17            moltype = DNA  length = 1317
FEATURE                  Location/Qualifiers
misc_feature             1..1317
                         note = C7
source                   1..1317
                         mol_type = other DNA
                         organism = synthetic construct
SEQUENCE: 17
atggccctga gaggcgtctc cgtgcggctg ctgagccgcg acccggcct gcacgtcctt  60
cgcacgtggg tctcgtcggc ggcgcagacc gagaaaggcg ggagaacaca gagccaactg  120
gctaagtcct cgcgtcccga gtttgactgg caggacccgc tggtgctgga ggagcagctg  180
accacagatg agatcctcat cagggacacc ttccgcacct actgccagga gagactcatg  240
cctcgcatcc tgttggccaa tcgcaacgaa gttttcatc gggagatcat ttcggagatg  300
ggggagttgg gtgtgctggg ccccaccatc aaaggatatg gctgtgctgg ggtttcgtct  360
gtggcctatg gctcctggc ccgagagctg gagcgggtgg acagtggcta caggtcggcg  420
atgagtgtcc agtcctccct cgtcatgcac cctatctatg cctatggcag cgaggaacag  480
cggcagaagt acctgcccca gctggccaag ggggagctcc tggctgctt tgggctcaca  540
gagccaaatt ctggttcaga cccatcatct atggaaacaa gggccattta caattcatct  600
aataagtcat acactctgaa tggtactaag acctggatca ccaactctcc aatggcagac  660
ctgtttgtag tttgggcaag atgtgaagat ggctgtatta ggggttttcct cctgagaag  720
ggcatgagag gtctctctgc accaaggatt cagggaaaat tctctctgag agcttctgct  780
acaggcatga ttattatgga tggggtggag gttcctgaga agaatgtgct gcctggagct  840
tcatcactgg ggggcccctt tggctgtctg aacaatgcca gatatggtat tgcatggggg  900
gttctggggg ctagtgagtt ctgcctgcac acagctagac agtatgctct ggataggatg  960
cagtttggtg ttcctctggc taggaaccag ctgattcaga aaaaactggc tgatatgctc  1020
acagagatta cactgggtct gcatgcttgt ctccagctgg gtagactcaa agatcaggat  1080
aaggctgctc cagaaatggt gtcactcctg aagaggaata actgtggaaa ggccctggac  1140
attgctagac aggctaggga tatgctgggt ggtaatggca tctcagatga atatcatgtt  1200
attagacatg ccatgaatct ggaggctgtt aacacttatg aaggcacaca tgatattcat  1260
gccctcatcc tggggagagc tattacaggt attcaggcct ttactgcttc taagtga  1317

SEQ ID NO: 18            moltype = DNA  length = 1317
```

| FEATURE | Location/Qualifiers |
|---|---|
| misc_feature | 1..1317 |
| | note = C8 |
| source | 1..1317 |
| | mol_type = other DNA |
| | organism = synthetic construct |

SEQUENCE: 18

```
atggccctga gaggcgtctc cgtgcggctg ctgagccgcg acccggcct gcacgtcctt    60
cgcacgtggg tctcgtcggc ggcgcagacc gagaaaggcg ggagaacaca gagccaactg   120
gctaagtcct cgcgtcccga gtttgactgg caggacccgc tggtgctgga ggagcagctg   180
accacagatg agatcctcat cagggacacc ttccgcacct actgccagga gagactcatg   240
cctcgcatcc tgttggccaa tcgcaacgaa gttttcatc gggagatcat ttcggagatg    300
ggggagttgg gtgtgctggg ccccaccatc aaaggatatg gctgtgctgg ggtttcgtct   360
gtggcctatg ggctcctggc ccgagagctg gagcgggtgg acagtgggta ggctgtggac   420
atgagtgtcc agtcctccct cgtcatgcac cctatctatg cctatggcag cgaggaacag   480
cggcagaagt acctgcccca gctgccaag ggggagctcc tgggctgctt cgggctcaca    540
gagcccaaca gcggaagtga ccccagcagc atggagacca gagcccacta caactcatcc   600
aacaagagct acaccctcaa tgggaccaag acctggatca cgaactcgcc tatggccgat   660
ctgtttgtag tgtgggctcg gtgtgaagat ggctgcattc ggggcttcct gctgagaag    720
gggatgcggg gtctctcggc cccaggatc agggcaagt tctcgctgcg ggcctcagcc     780
acaggcatga tcatcatgga cggtgtggag gtgccagagg agaatgtgct ccctggtgca   840
tccagctgg ggggtccctt cggctgtctg aacaatgcca gatatggtat tgcatgggtg   900
gttctggggg ctagtgagtt ctgcctgcac acagctagac agtatgctct ggataggatg   960
cagtttggtg ttcctctggc taggaaccag ctgattcaga aaaaactggc tgtatatgctc  1020
acagagatta cactgggtct gcatgcttgt ctccagctgg gtagactcaa agatcaggat  1080
aaggctgctc cagaaatggt gtcactcctg aagaggaata actgtggcaa ggctcttgac  1140
attgctagac aggctaggga tatgctgggt ggtaatggca tctcagatga atatcatgtt  1200
attagacatg ccatgaatct ggaggctgtt aacacttatg aaggcacaca tgatattcat  1260
gccctcatcc tggggagagc tattacaggt attcaggcct ttactgcttc taagtga     1317
```

| SEQ ID NO: 19 | moltype = DNA  length = 2454 |
|---|---|
| FEATURE | Location/Qualifiers |
| misc_feature | 1..2454 |
| | note = V1 |
| source | 1..2454 |
| | mol_type = other DNA |
| | organism = synthetic construct |

SEQUENCE: 19

```
ctgcgcgctc gctcgctcac tgaggccgcc cgggcaaagc ccgggcgtcg ggcgacctttt   60
ggtcgcccgg cctcagtgag cgagcgagcg cgcagagagg gagtgggggtt aaacgttgac   120
attgattatt gcgcctcta gactcgaggc gttgacattg attattgact agttattaat    180
agtaatcaat tacgggggtca ttagttcata gcccatatat ggagttccgc gttacataac   240
ttacggtaaa tggcccgcct ggctgaccgc ccaacgaccc ccgcccattg acgtcaataa   300
tgacgtatgt tcccatagta acgccaatag ggactttcca ttgacgtcaa tgggtggagt   360
atttacggta aactgcccac ttggcagtac atcaagtgta tcatatgcca agtacgcccc   420
ctattgacgt caatgacggt aaatggcccg cctggcatta tgcccagtac atgaccttat   480
gggactttcc tacttggcag tacatctacg tattagtcat cgctattacc atggtgatgc   540
ggttttggca gtacatcaat gggcgtggat agcggtttga ctcacgggga tttccaagtc   600
tccaccccat tgacgtcaat gggagtttgt tttggcacca aaatcaacgg gactttccaa   660
aatgtcgtaa caactccgcc ccattgacgc aaatgggcgg taggcgtgta cggtgggagg   720
tctatataag cagagctaag cttgccgcca ccatgctgct gagagcgtc tccgtgcgc    780
tgctgagccg cggaccccggc ctgcacgtcc ttcgcacgtg gtctcgtcg gcggcgcaga   840
ccgagaaagg cgggagaaca cagagccaac tggctaagtc ctcgcgtccc gagttttgact   900
ggcaggaccc gctggtgctg gaggagcagc tgaccacaga tgagatcctc atcagggaca   960
ccttccgcac ctactgccag gagagactca tgcctcgcat cctgttggcc aatcgcaacg  1020
aagttttca tcgggagatc atttcggaga tggggggagt tgggtgtgctg ggccccacca  1080
tcaaaggata tggctgtgct ggggtttcgt ctgtggccta tgggctcctg gcccgagagc  1140
tggagcgggt ggacagtggc tacaggtcgg cgatgagtgt ccagtcctcc ctcgtcatgc  1200
accctatcta tgcctatggc agcgaggaac agcggcagaa gtacctgccc cagctggcca  1260
agggggagct cctgggctgc ttcgggctca cagagcccaa cagcggaagt gaccccagca  1320
gcatggagac cagagcccac tacaactcat ccaacaagag ctacaccctc aatgggacca  1380
agacctggat cacgaactcg cctatggccg atctgtttgt agtgtgggct cggtgtgaag  1440
atggctgcat tcggggcttc ctgctggaga ggggatgcg ggtctctcg gcccccagga   1500
tccagggcaa gttctcgctg cgggcctcag ccacaggcat gatcatcatg gacggtgtgg  1560
aggtgccaga ggagaatgtg ctccctggtg catccagctg gggggtccc ttcggctgcc   1620
tgaacaacgc ccgtacggc atcgcgtggg gcgtgcttgg agcttcggag ttctgcttgc   1680
acacagcccg gcagtacgcc ctcgacagga tgcagtttgg tgtcccactg gccaggaacc  1740
agctgattca gaagaaagctg gcagacatgc tcactgagat taccctggcc cttcacgcct  1800
gcctgcagct cggccgcttg aaggaccagg acaaggctgc ccccgagatg gtttctctgct 1860
tgaagaggaa taactgtggg aaagccctgg acatcgcccg ccaggccga cattgctgg    1920
gggaatgg gatttctgac gagtatcacg tgatccggca cgccatgaac ctggaggccg   1980
tgaacaccta cgaaggtaca catgacattc acgcccctgat ccttgggaga gctatcacgg  2040
gaatccaggc gttcacggcc agcaagtaag aattccgac atgataagat acattgatga  2100
caacaaa accacaacta gaatgcagtg aaaaaaactg tttatttgtg aaatttgtga  2160
tgctattgct ttatttgtaa ccattataag ctgcaataaa caagttaaca acaacaattg  2220
cattcatttt atgtttcagg ttcagggga ggtgtgggag gttttttcgt tactagagca   2280
tggctacgta gataagtagc atggcgggtt aatcattaac tacaaggaac ccctagtgat  2340
ggagttggcc actccctctc tgcgcgctcg ctcgctcact gaggccgggc gaccaaaggt  2400
cgcccgacgc ccgggctttg cccgggcgg ctcagtgagc gagcgagcgc gcag         2454
```

```
SEQ ID NO: 20          moltype = DNA  length = 2088
FEATURE                Location/Qualifiers
misc_feature           1..2088
                       note = V2
source                 1..2088
                       mol_type = other DNA
                       organism = synthetic construct
SEQUENCE: 20
ctgcgcgctc gctcgctcac tgaggccgcc cgggcaaagc ccgggcgtcg ggcgaccttt   60
ggtcgcccgg cctcagtgag cgagcgagcg cgcagagagg gagtgggggtt atctagacct  120
aggactagtg gctccggtgc ccgtcagtgg gcagagcgca catcgcccac agtccccgag  180
aagttggggg gaggggtcgg caattgaacg ggtgcctaga gaaggtggcg cggggtaaac  240
tgggaaagtg atgtcgtgta ctggctccgc cttttcccg agggtggggg agaaccgtat   300
ataagtgcag tagtcgccgt gaacgttctt tttcgcaacg ggtttgccgc cagaacacag  360
gtcagtgtgg ggtcgggagt gtggagggaa ggagggagga actgggggtt tagggacttt  420
ccggggtgac tttcccgttc tgtgcttgca gaagcttgcc gccaccatgg ctctgagagg  480
ggtgagcgtc agactgctga gcagagccc tggcctgcat gtgctgagaa catgggtgtc  540
cagcgctgct cagacagaga aggggggcag aacacagaga caactggcca agagcagcag  600
acctgaattt gactggcaag acccctggt cctggaggag cagctgacca cagatgagat   660
cctgatcaga gacaccttca gaacctactg ccaagagaga ctgatgccta gaatcctgct  720
ggccaacaga aatgaggtct tccacagaga aatcattagc gagatggggg agctggggggt  780
gctgggccct acaatcaagg gctatgctg tgctgggggtg agcagcgtgg cctatgccct  840
gctggctaga gagctggaga gagtggacag cgggtacaga agcgctatga gcgtgcagag  900
cagcctggtc atgcacccca tctatgccta tggcagcgag gagcagagac agaaatatct  960
ccctcagctg gccaaggggg agctgctggg ctgctttgg ctcacagagc ccaatagcgg 1020
cagcgaccct agcagcatgg agacaagagc ccactacaac agcagcaaca agagctacac 1080
cctgaatggc accaagacat ggatcacaaa cagccccatg gctgatctct tgtggtctg  1140
ggctagatgt gaggatggct gtatcagagg cttttctcctg gagaagggca tgagaggcct 1200
gagcgctcct agaatccaag gcaaattcag cctcagagct tccgccaccg ggatgatcat 1260
catgatgggg gtggaggtcc ctgaggagaa tgtgctgcct ggggctagct cctgggggggg 1320
ccccttttggc tgtctcaata atgctagata tggcattgcc tgggggggtgc tggggggccag 1380
cgagttctgc ctgcatacag ctagacaata tgccctggac agaatgcagt ttgggggtgcc 1440
cctggctaga aatcagctga ttcagaagaa gctggctgac atgctggacag agatcacact 1500
gggcctgcat gcctgtctgc agctggggggag actgaaggac caagataagg ctgcccctga 1560
gatggtgagc ctgctgaaga gaaataactg tgggaaagct ctggacattg ctagacaagc 1620
tagagacatg ctgggggggca atggcatctc cgatgagtac catgtcatca gacatgccat 1680
gaacctggag gctgtgaaca cctatgaggg cacacatgac atccatgccc tgatcctggg 1740
cagagccatc accggcatcc aagccttcac agctagcaag tgaaattcc agacatgata 1800
agatacattg atgagtttgg acaaaccaca actagaatgc agtgaaaaaa atgctttatt 1860
tgtgaaattt gtgatgctat tgctttattt gtaaccatta taagctgcaa taaacaagtt 1920
aacaacaaca attgcattca ggttaatcat taactacaag gaaccccttag tgatggagtt 1980
ggccactccc tctctgcgcg ctcgctcgct cactgaggcc gggcgaccaa aggtcgcccg 2040
acgcccgggc tttgcccggg cggcctcagt gagcgagcga gcgcgcag              2088

SEQ ID NO: 21          moltype = DNA  length = 2226
FEATURE                Location/Qualifiers
misc_feature           1..2226
                       note = V3
source                 1..2226
                       mol_type = other DNA
                       organism = synthetic construct
SEQUENCE: 21
ctgcgcgctc gctcgctcac tgaggccgcc cgggcaaagc ccgggcgtcg ggcgaccttt   60
ggtcgcccgg cctcagtgag cgagcgagcg cgcagagagg gagtgggggtt atgaatgcaa  120
ttgttgttgt taacttgttt attgcagctt ataatggtta caaataaagc aatagcatca  180
caaatttcac aaataaagca ttttttttcac tgcattctag ttgtggtttg tccaaactca  240
tcaatgtatc ttatcatgtc tggaattctc acttgctagc tgtgaaggct tggatgccgg  300
tgatggctct gcccaggatc agggcatgga tgtcatgtgt gccctcatag gtgttcacag  360
cctccaggtt catggcatgt ctgatgacat ggtactcatc ggagatgcca ttgccccca   420
gcatgtctct agcttgtcta gcaatgtcca gagctttccc acagttattt ctcttcagca  480
ggctcaccat ctcaggggca gcttatctt ggtccttcag tctccccagc tgcagacagg  540
catgcaggcc cagtgtgatc tctgtcagca tgtcagccag cttcttctga atcagctgat  600
ttctagccag gggcacccca aactgcattc tgtccaggsc atattgtcta gctatgca    660
ggcagaactc gctggccccc agcacccccc aggcaatgcc atatctagca ttattgagac  720
agccaaaggg gccccccagg gagctagccc caggcagcac attctcctca gggaccteca  780
ccccatccat gatgatcatc ccggtggcgg aagctctgag gctgaatttg ccttggattc  840
taggagcgct caggcctctc atgcccttct ccaggagaaa gcctctgata cagccatcct  900
cacatctagc ccagaccaca aagagatcag ccattgatc catgtcttgg  960
tgccattcag ggtgtagctc ttgttgctgc tgttgtagtg ggctcttgtc tccatgctgc 1020
tagggtcgct gccgctattg ggctctgtga ggccaaagca gcccagcagc tcccccttgg 1080
ccagctgagg gagatatttc tgtctctgct cctcgctgcc ataggcatag atggggtgca 1140
tgaccaggct gctctgcacg ctcatagcgc ttctgtaccc gctgtccact ctctccagct 1200
ctctagccag caggctcatg gccacgctgc tcaccccag ccttgattg                 1260
taggcccag caccccagc tccccatcct cgctaatgat ttctctgtgg aagacctcat 1320
ttctgttggc cagcaggatt ctaggcatca gtctctcttg gcagtaggtt ctgaaggtgt 1380
ctctgatcag gatctcatct gtggtcagct gctcctccag gaccagggggg tcttgccagt 1440
caaattcagg tctgctgctc ttggccagtt ggctctgtgt tctgccccc ttctctgtct 1500
gagcagcgct ggacacccat gttctcagca catgcaggcc agggcctctg ctcagcagtc 1560
```

```
tgacgctcac ccctctcaga gccatggtgg cggcaagctt ctgaaaaaaa gtgatttcag    1620
gcaggtgctc caggtaatta aacattaata ccccaccaac caaccatccc ttaaaccctt    1680
acctcttgct cagctaatta cagcccggag gagaagggcc gtcccgcccg ctcacctgtg    1740
ggagtaacgc ggtcagtcag agccggggcg ggcggcgcga ggcggcggcg gagcggggca    1800
cggggcgaag gcagcgtcgc agcgactccc tgtgttctgg cggcaaaccc gttgcgaaaa    1860
agaacgttca cggcgactac tgcacttata tacggttctc ccccaccctc gggaaaaagg    1920
cggagccagt acacgacatc actttcccag tttacccgc gccacttct ctaggcaccc    1980
gttcaattgc cgaccctcc ccccaacttc tcggggactg tgggcgatgt gcgctctgcc    2040
cactgacggg caccggagcc actagtccta ggtctagagg ttaatcatta actacaagga    2100
accctagtg atggagttgg ccactccctc tctgcgcgct cgctcagtca ctgaggccgg    2160
gcgaccaaag gtcgcccgac gcccgggctt tgcccggggc gcctcagtga gcgagcgagc    2220
gcgcag                                                                2226

SEQ ID NO: 22             moltype = DNA   length = 106
FEATURE                   Location/Qualifiers
misc_feature              1..106
                          note = L-LTR
source                    1..106
                          mol_type = other DNA
                          organism = synthetic construct
SEQUENCE: 22
ctgcgcgctc gctcgctcac tgaggccgcc cgggcaaagc ccgggcgtcg ggcgaccttt     60
ggtcgcccgg cctcagtgag cgagcgagcg cgcagagagg gagtgg                  106

SEQ ID NO: 23             moltype = DNA   length = 130
FEATURE                   Location/Qualifiers
misc_feature              1..130
                          note = R-LTR
source                    1..130
                          mol_type = other DNA
                          organism = synthetic construct
SEQUENCE: 23
aggaaccct agtgatggag ttggccactc cctctctgcg cgctcgctcg ctcactgagg     60
ccgggcgacc aaaggtcgcc cgacgcccgg gctttgcccg gcggcctca gtgagcgagc    120
gagcgcgcag                                                          130

SEQ ID NO: 24             moltype = DNA   length = 380
FEATURE                   Location/Qualifiers
misc_feature              1..380
                          note = CMV enhancer
source                    1..380
                          mol_type = other DNA
                          organism = synthetic construct
SEQUENCE: 24
gacattgatt attgactagt tattaatagt aatcaattac ggggtcatta gttcatagcc     60
catatatgga gttccgcgtt acataactta cggtaaatgg cccgcctggc tgaccgccca    120
acgacccccg cccattgacg tcaataatga cgtatgttcc catagtaacg ccaatagggca    180
ctttccattg acgtcaatgg gtggagtatt tacggtaaac tgcccacttg gcagtacatc    240
aagtgtatca tatgccaagt acgccccta ttgacgtcaa tgacggtaaa tggcccgcct    300
ggcattatgc ccagtacatg accttatggg actttcctac ttggcagtac atctacgtat    360
tagtcatcgc tattaccatg                                                380

SEQ ID NO: 25             moltype = DNA   length = 204
FEATURE                   Location/Qualifiers
misc_feature              1..204
                          note = CMV promoter
source                    1..204
                          mol_type = other DNA
                          organism = synthetic construct
SEQUENCE: 25
gtgatgcggt tttggcagta catcaatggg cgtggatagc ggtttgactc acggggattt     60
ccaagtctcc accccattga cgtcaatggg agtttgtttt ggcaccaaaa tcaacgggac    120
tttccaaaat gtcgtaacaa ctccgcccca ttgacgcaaa tgggcggtag gcgtgtacgg    180
tgggaggtct atataagcag agct                                           204

SEQ ID NO: 26             moltype = DNA   length = 278
FEATURE                   Location/Qualifiers
misc_feature              1..278
                          note = CBA promoter
source                    1..278
                          mol_type = other DNA
                          organism = synthetic construct
SEQUENCE: 26
tcgaggtgag ccccacgttc tgcttcactc tccccatctc cccccctcc ccacccccaa     60
ttttgtattt atttattttt taattatttt gtgcagcgat ggggggcgggg ggggggggg   120
ggcgcgcgcc aggcggggcg ggggcgggcg aggggcgggg cggggcgagg cggagaggtg    180
cggcggcagc caatcagagc ggcgcgctcc gaaagtttcc ttttatggcg aggcggcggc    240
ggcggcggcc ctataaaaag cgaagcgcgc ggcgggcg                            278
```

```
SEQ ID NO: 27              moltype = DNA  length = 91
FEATURE                    Location/Qualifiers
misc_feature               1..91
                           note = hGCDH intron 1
source                     1..91
                           mol_type = other DNA
                           organism = synthetic construct
SEQUENCE: 27
gtcagtgtgg ggtcgggagt gtggagggaa ggagggagga actgggggtt tagggacttt    60
ccggggtgac tttcccgttc tgtgcttgca g                                   91

SEQ ID NO: 28              moltype = DNA  length = 97
FEATURE                    Location/Qualifiers
misc_feature               1..97
                           note = SV40 intron
source                     1..97
                           mol_type = other DNA
                           organism = synthetic construct
SEQUENCE: 28
gtaagtttag tcttttgtc ttttatttca gtcccggat ccggtggtgg tgcaaatcaa      60
agaactgctc ctcagtggat gttgccttta cttctag                             97

SEQ ID NO: 29              moltype = DNA  length = 231
FEATURE                    Location/Qualifiers
misc_feature               1..231
                           note = EF-1  core promoter
source                     1..231
                           mol_type = other DNA
                           organism = synthetic construct
SEQUENCE: 29
ggctccggtg cccgtcagtg ggcagagcgc acatcgccca cagtccccga gaagttgggg    60
ggaggggtcg gcaattgaac cggtgcctag agaaggtggc gcggggtaaa ctggaaagt    120
gatgtcgtgt actggctccg ccttttttccc gagggtgggg gagaaccgta tataagtgca  180
gtagtcgccg tgaacgttct ttttcgcaac gggtttgccg ccagaacaca g            231

SEQ ID NO: 30              moltype = DNA  length = 308
FEATURE                    Location/Qualifiers
misc_feature               1..308
                           note = hGCDH intron 2
source                     1..308
                           mol_type = other DNA
                           organism = synthetic construct
SEQUENCE: 30
gtaaggacct ctggtcgcac cgtgtgtctg ctgcccctgt tcagctgtct gtctgccgca    60
ggtggactct gtcccagaat ccgagagctg cccgagcggg gtggcagggt cgtgccagg   120
gtcagaggca ctaaggcagt gagtgcgctg tgcctgcggg gccggagaaa agtcacctga  180
tcagtctcgc ttgcagctcg cactagccgg ggggcgacat gggtgttggg gggtagggct  240
gatgagggtc cgagaaggga gggcacagtg atcttgcgga ctggaccgag gcgaattccc  300
cttcccag                                                            308

SEQ ID NO: 31              moltype = DNA  length = 141
FEATURE                    Location/Qualifiers
misc_feature               1..141
                           note = hGCDH intron 3
source                     1..141
                           mol_type = other DNA
                           organism = synthetic construct
SEQUENCE: 31
gtgggcgggc tggtgggtgc cctgagactg ctcctccgcc tggagccata gccaccccac    60
ctcaaggccc tctctgtcctt ggggctgggg cttcctgtgg cctaggcctg ggcctgaatt  120
tgggcactgg tccctttgca g                                             141

SEQ ID NO: 32              moltype = DNA  length = 229
FEATURE                    Location/Qualifiers
misc_feature               1..229
                           note = hybrid intron
source                     1..229
                           mol_type = other DNA
                           organism = synthetic construct
SEQUENCE: 32
ggagtcgctg cgacgctgcc ttcgccccgt gccccgctcc gccgccgcct cgcgccgccc    60
gccccggctc tgactgaccg cgttactccc acaggtgagc gggcgggacg gcccttctcc  120
tccgggctgt aattagctga gcaagaggta agggtttaag ggatggttgg ttggtggggt  180
attaatgttt aattacctgg agcacctgcc tgaaatcact ttttttcag               229

SEQ ID NO: 33              moltype = AA  length = 438
FEATURE                    Location/Qualifiers
REGION                     1..438
                           note = GCDH prot
```

```
source          1..438
                mol_type = protein
                organism = synthetic construct
SEQUENCE: 33
MALRGVSVRL LSRGPGLHVL RTWVSSAAQT EKGGRTQSQL AKSSRPEFDW QDPLVLEEQL    60
TTDEILIRDT FRTYCQERLM PRILLANRNE VFHREIISEM GELGVLGPTI KGYGCAGVSS   120
VAYGLLAREL ERVDSGYRSA MSVQSSLVMH PIYAYGSEEQ RQKYLPQLAK GELLGCFGLT   180
EPNSGSDPSS METRAHYNSS NKSYTLNGTK TWITNSPMAD LFVVWARCED GCIRGFLLEK   240
GMRGLSAPRI QGKFSLRASA TGMIIMDGVE VPEENVLPGA SSLGGPFGCL NNARYGIAWG   300
VLGASEFCLH TARQYALDRM QFGVPLARNQ LIQKKLADML TEITLGLHAC LQLGRLKDQD   360
KAAPEMVSLL KRNNCGKALD IARQARDMLG GNGISDEYHV IRHAMNLEAV NTYEGTHDIH   420
ALILGRAITG IQAFTASK                                                 438
```

RECOMBINANT AAV VECTORS FOR TREATING GLUTARIC ACIDURIA TYPE I

CROSS-REFERENCE

This application is a continuation application of PCT International Application No. PCT/CN2023/094298, filed May 15, 2023, which claims the benefit of China Patent Application PCT/CN2022/093084, filed May 16, 2022, which all is incorporated herein by reference in its entirety.

FIELD OF THE INVENTION

The present disclosure relates to the technical field of gene therapy. Specifically, the present disclosure provides a recombinant adeno-associated viral (rAAV) vector comprising a nucleotide sequence encoding human glutaryl-coA dehydrogenase (GCDH), for treating a disorder or condition caused by the deficiency of glutaryl-coA dehydrogenase (GCDH), especially Glutaric aciduria type I (GA-I).

SEQUENCE LISTING

In accordance with 37 CFR § 1.52(e)(5) and with 37 CFR § 1.831, the specification makes reference to a Sequence Listing submitted electronically as a .xml file named 20241115_19684.0089FPWO_sql.xml. Said .XML copy is 66,000 bytes in size. The entire contents of the Sequence Listing are hereby incorporated by reference.

BACKGROUND

First described in 1974, glutaric aciduria is an inherited neurometabolic disorder [1]. With elevated glutaric acid (GA) in plasma, urine and cerebrospinal fluid (CSF), patients suffer from neurodegenerative disorder [1,2]. Glutaric aciduria type I (GA-I) is an autosomal recessive metabolic disorder caused by the deficiency of glutaryl-CoA dehydrogenase (GCDH; EC 1.3.99.7) [3]. Located in mitochondria, GCDH is a key enzyme in the metabolism of L-lysine, L-hydroxylysine and L-tryptophan. Glutaryl-CoA is an intermediate of this pathway and is dehydrogenated and decarboxylated to crotonyl-CoA by GCDH. When GCDH is deficient, glutaryl-CoA cannot be catalyzed correctly and the by-product—GA is generated. The accumulation of GA in the brain causes neurotoxicity and neurodegenerative disorder [4]. Patients will suffer from macrocephaly, hypotonia and acute encephalopathy crisis. Without proper treatment, GA-I patients' life expectancy could be only 2-3 years. In mammals, GA can bind to carnitine and forms glutarylcarnitine (C5DC), so that GA is eliminated and detoxicated to some extent. In clinic, carnitine supplementation is a widely used treatment for GA-I patients. Carnitine supplementation not only decreases GA levels but also prevents secondary carnitine deficiency [5].

The global incidence of GA-I is estimated to be 1/100, 000. About 75,000 patients suffer from this inherited metabolic disorder. Current treatments include diet control and carnitine supplementation. However, diet control of protein restriction could be hard to adhere in daily life, and carnitine supplementation cannot eliminate 3-hydroxy glutaric acid (3-OH-GA) and glutaconic acid [6].

There still exists an unmet need for an efficient treatment of disorders caused by the deficiency of GCDH, especially a curative treatment for GA-I.

SUMMARY OF THE INVENTION

Gene therapy has been proven to be efficient in treating inherited metabolic disorders, as demonstrated in both animal models and clinical trials. Gene replacement strategy based on adeno-associated virus (AAV) has been proven to be effective in a variety of recessive genetic disorders.

GA-I is a neurometabolic disorder and GCDH deficiency mainly causes damages to the central nervous system (CNS). Evidences have suggested that blood-brain barrier has low permeability for dicarboxylic acid, GCDH deficiency in the CNS cells causes in situ GA accumulation and therefore neurotoxicity [7]. Normalization of the CNS amino acid metabolism and decrease of the CNS GA accumulation by delivering rAAV carrying GCDH expression cassette directly to the CNS could benefit GA-1 patients. The Gcdh$^{-/-}$ mice have similar life expectancy as the wild-type C57BL/6 mice [8]. To mimic the situation of acute encephalopathic crisis, GCDH knockout mice were challenged with high protein diet [9]. High protein diet (HPD) challenge was lethal to the 4-week-old Gcdh$^{-/-}$ mice within 2-3 days. Under HPD challenge, Gcdh$^{-/-}$ mice developed GA accumulation, vasogenic oedema, neuronal loss, paralysis, seizures [9]. Thus, Gcdh$^{-/-}$ mice exposed to high protein may be a useful model of human GA-1 including developmentally dependent striatal vulnerability [9].

For the first time, the present inventors have developed an rAAV vector comprising an optimized GCDH coding sequence under the control of a specially designed promoter, and verified its effect in alleviating symptoms due to GA accumulation in Gcdh$^{-/-}$ mouse model under HPD challenge, thus completing the invention.

Therefore, in a first aspect, the present application provides an isolated nucleic acid molecule, comprising a nucleotide sequence selected from a group of nucleotide sequences consisting of SEQ ID NOs: 11-18 (coding sequences C1-C8), wherein the nucleotide sequence encodes human GCDH polypeptide having an amino acid sequence as shown in SEQ ID NO: 33. In a specific embodiment, the isolated nucleic acid molecule, comprising a nucleotide sequence as shown in SEQ ID NO: 12 (coding sequence C2). The coding sequence of the present application has a reduced CpG number as compared to the wild-type coding sequence of hGCDH as shown in SEQ ID NO: 10.

In a second aspect, the present application provides a promoter component having a nucleotide sequence selected from a group of nucleotide sequences consisting of SEQ ID NOs: 2-9 (promoter components P1-P8). In a preferred embodiment, the promoter component has a nucleotide sequence as shown in SEQ ID NO: 5 or SEQ ID NO: 9 (P4 or P8).

In a third aspect, the present application provides an expression cassette, comprising a coding sequence for the human GCDH polypeptide having an amino acid sequence as shown in SEQ ID NO: 33, operatively linked to a promoter component, wherein the coding sequence has a nucleotide sequence selected from a group of nucleotide sequences consisting of SEQ ID NOs: 11-18, and the promoter component has a nucleotide sequence selected from a group of nucleotide sequences consisting of SEQ ID NOs: 2-9. In a preferred embodiment, the expression cassette comprising a coding sequence having a nucleotide sequence as shown in SEQ ID NO: 12, under the control of a promoter component having a nucleotide sequence as shown in SEQ ID NO: 5 or SEQ ID NO: 9. In a more specific embodiment, the expression cassette comprises a nucleotide sequence as shown in SEQ ID NO: 20 or SEQ ID NO: 21 (V2 or V3).

In a fourth aspect, the present application provides a rAAV vector, comprising the isolated nucleic acid molecule of the first aspect or the expression cassette of the third aspect. In a preferred embodiment, the rAAV vector provides a desirable expression level of human GCDH protein in target tissues, e.g., disease relevant tissues in the CNS.

In a fifth aspect, the present application provides an AAV viral particle comprising the rAAV vector packaged into an AAV capsid. The AAV capsid can be derived from any AAV serotype, e.g., AAV1, AAV2, AAV3B, AAV5, AAV6, AAV7, AAV8, AAV9, AAVLK03, AAVS3, AAVKP1, AAVrh10, AAVNP40, AAVNP59, AAV-DJ, AAVAnc80L65, AAVsL65, AAVHSC15, AAVC102, AAV204, AAV214. In one embodiment, the AAV capsid is a capsid with CNS tropism, such as AAV9 or AAV PHP.B capsid.

In a sixth aspect, the present application provides a pharmaceutical composition comprising the rAAV vectors of the fourth aspect or the viral particle of the fifth aspect, and a pharmaceutically acceptable excipient.

In a seventh aspect, the present application provides a method for treating GA-I in a subject in need thereof, comprising administering to the subject a therapeutically effective amount of the rAAV vector of the fourth aspect, the rAAV particle of the fifth aspect or the pharmaceutical composition of the sixth aspect.

In an eighth aspect, the present application provides use of the rAAV vector of the fourth aspect, the rAAV particle of the fifth aspect or the pharmaceutical composition of the sixth aspect in treating GA-I patients.

DETAILED DESCRIPTION OF THE INVENTION

Figure 1:
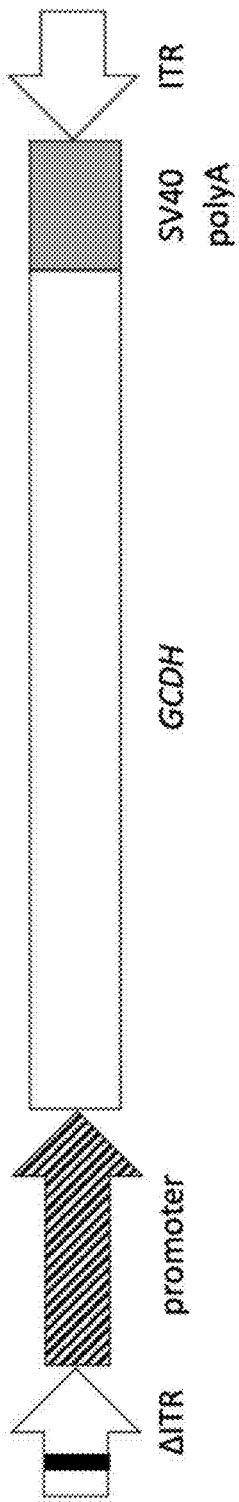
FIG. 1 shows the illustration of GCDH expression vectors in Example 1.

Unless specifically defined elsewhere in this document, all of the technical and scientific terms used herein have the meaning commonly understood by one of ordinary skill in the art to which this invention belongs.

As used herein, including the appended claims, the singular forms of words such as "a", "an", and "the", include their corresponding plural references unless the context clearly dictates otherwise.

In the context of the present disclosure, unless being otherwise indicated, the wording "comprise", and variations thereof such as "comprises" and "comprising" will be understood to imply the inclusion of a stated element, e.g. an amino acid sequence, a nucleotide sequence, a property, a step or a group thereof, but not the exclusion of any other elements, e.g. amino acid sequences, nucleotide sequences, properties and steps. When used herein the term "comprise" or any variation thereof can be substituted with the term "contain", "include" or sometimes "have" or equivalent variation thereof. In certain embodiments, the wording "comprise" also include the scenario of "consisting of".

Coding Sequence of hGCDH

As an essential part of the expression cassette, the present disclosure first provides a group of codon-optimized nucleotide sequences encoding for hGCDH polypeptide having an amino acid sequence as shown in SEQ ID NO: 33.

By "isolated nucleic acid", it means a DNA or RNA which is removed from all or a portion of a polynucleotide in which the isolated polynucleotide is found in nature, or is linked to a polynucleotide to which it is not linked in nature. An isolated nucleic acid molecule "comprising" a specific nucleotide sequence may include, in addition to the specified sequence, operably linked regulatory sequences that control expression of the coding region of the recited nucleic acid sequences. Due to the codon degeneracy, one skilled in the art understands that any specific amino acid sequence can be coded by several different nucleotide sequences.

"Codon-optimized coding sequence" herein refers to a nucleotide sequence coding for hGCDH protein modified from their wild-type coding sequence accommodating codon bias. Optimization may be achieved by reducing sequence complexity, adjusting GC content, adjusting codon usage and/or avoiding rare codons. The coding sequence which has been codon optimized usually shows an increased translational efficiency of the gene of interest (GOI), leading to a higher protein expression.

The codon-optimized coding sequence of hGCDH of the present application has a reduced CpG number as compared to the wild-type coding sequence of hGCDH as shown in SEQ ID NO: 10. "CpG content" or "CpG number" refers to the content or numbers of cytosine (C) guanine (G) dinucleotides linked by phosphate (p) in a DNA sequence. "CpG islands" are genomic regions where CpG dinucleotides occur with a higher frequency. For example, the algorithm described by Gardiner-Garden and Frommer (1987) can be used to determine the presence of CpG islands. Specifically, a region containing at least 200 bp, in which the proportion of GCs exceeds 50%, and the observed/predicted ratio of CpG is higher than 0.6, this region is called "CpG island". The predicted value of CpG can be calculated as the number of Cs in an observation window multiplied by the number of Gs in the window, divided by the window length. In mammals, unmethylated CpGs of exogenous genes are recognized by TLR9 resulting in activation of $CD8^+$ T cells to clear the infected cells, which is not favored for long-term expression of the exogenous genes. Therefore, in order to express the GCDH-encoding gene more efficiently, it is preferable to reduce the numbers of CpGs in the hGCDH coding sequences. The coding sequences of the present invention preferably have lower CpG contents. When the CpG content is a factor to consider during codon optimization, it further increases the complexity of sequence design and validation work.

The wild-type coding sequence of hGCDH as shown in SEQ ID NO: 10 has a CpG number of 73. Preferably, the hGCDH coding sequence of the present application has a CpG number lower than 73. For example, the hGCDH coding sequence of the present application has a CpG number no more than 65, no more than 55, no more than 50, no more than 45, no more than 40, no more than 35, no more than 30, no more than 25, no more than 20. For example, the hGCDH coding sequence of the present application has a CpG number at least 10% less than the CpG number of the wild-type coding sequence of hGCDH (e.g., the nucleotide sequence as shown in SEQ ID NO: 10), preferably at least 20% less, at least 30% less, at least 40% less, at least 50% less, at least 60% less, at least 70% less, at least 80% less, at least 90% less, than the CpG number of the wild-type coding sequence of hGCDH (e.g., the nucleotide sequence as shown in SEQ ID NO: 10). In a specific embodiment of the present application, the hGCDH coding sequence having a nucleotide sequence of SEQ ID NO: 12 (coding sequence C2) has a CpG number as low as 16.

In preferred embodiments, the codon-optimized coding sequence for human GCDH protein comprises or consists of a nucleotide sequence selected from SEQ ID No: 11-18. In one particularly preferred embodiment, the codon-optimized coding sequence for human GCDH protein comprises or consists of a nucleotide sequence as shown in SEQ ID No: 12.

Regulatory Sequences

Further, an expression cassette can comprise one or more regulatory sequences in addition to the coding sequence. Regulatory sequence can be selected from one or more of promoter, enhancer, polyadenylation sequence, and translation termination signal. A certain combination of regulatory sequences of the present disclosure can achieve unexpected effect in improving the expression efficiency of the coding sequence.

In one aspect, the present application provides a series of new promoter components. By "promoter component", it refers to a sequence component located 5' upstream of the coding sequence, and is consisted of a promoter and optionally additional element(s) such as enhancer and/or an intron-derived fragment, in which the enhancer usually locates upstream of the promoter and the intron-derived fragment usually locates downstream of the promoter.

The term "promoter" refers to a DNA sequence enables initiation of transcription of a downstream gene under the control of the said promoter. Promoters include but not limited to constitutive promoters, cell type-specific promoters, tissue-specific promoters, development stage-specific promoters. Promoter can be a naturally occurring promoter of a gene, a modified version of a naturally occurring promoter or a synthetic promoter.

In preferred embodiments, the promoter of the present disclosure can be a constitutive promoter. For example, the promoter can be a cytomegalovirus (CMV) promoter, a chicken β-actin (CBA) promoter, or a human elongation factor-1 alpha (EF-1α) promoter. In one embodiment, the promoter is a CMV promoter having the nucleotide sequence as shown in SEQ ID NO: 25. In one embodiment, the promoter is a CBA promoter having the nucleotide sequence as shown in SEQ ID NO: 26. In one embodiment, the promoter is an EF-1α core promoter having the nucleotide sequence as shown in SEQ ID NO: 29.

"Enhancer" is a regulatory DNA sequence which can enhance the transcription of the GOI in AAV together with the promoter. In some embodiments, the promoter component of the present application comprises an enhancer. More preferably, the enhancer can be a CMV enhancer. For example, the CMV enhancer can have a nucleotide sequence as shown in SEQ ID NO: 24.

"Intron-derived fragment" is a sequence derived from an intron of a gene. It has been reported that gene transcription can be enhanced by a splicing-competent intron. In preferred embodiments, the promoter component or the expression cassette of the present application comprises an intron-derived fragment.

In some embodiments, the intron-derived fragment is originated from the intron of SV40, e.g., an intron-derived fragment having a nucleotide sequence as shown in SEQ ID NO: 28.

In some embodiments, the intron-derived fragment is originated from any intron of the human GCDH. For example, the intron sequence is consisted of one or more fragments derived from one or more intronic regions of the human GCDH gene. In preferred embodiments, the promoter component or the expression cassette of the present application comprises an intron-derived fragment having a nucleotide sequence as shown in any of SEQ ID NO: 27, 30, or 31 (hGCDH intron 1, hGCDH intron 2 or hGCDH intron 3, respectively). For example, the intron-derived fragment can be a combination of any two or three of hGCDH intron 1 (SEQ ID NO: 27), hGCDH intron 2 (SEQ ID NO: 30) and hGCDH intron 3 (SEQ ID NO: 31).

In some embodiments, the intron-derived fragment is a hybrid intron. By "hybrid intron", it refers to an intron fragment comprising at least two sequences from different origins, or from the same origin but not in consecutive in natural state. For example, the promoter component or the expression cassette of the present application comprises a hybrid intron as the intron-derived fragment, wherein the hybrid intron comprises two intron-derived fragments originated from chicken β-actin (CBA) and minute virus of mice (MMV) introns as shown in SEQ ID NO: 32.

Preferably, the intron-derived fragment has a total length of about or less than 200 bp, about or less than 250 bp, about or less than 300 bp, about or less than 350 bp, about or less than 400 bp.

In some embodiments, the promoter component of the present application comprises a CMV enhancer, a CBA promoter, and optionally an intron-derived fragment. In this case, the intron-derived fragment is preferably an intron derived from the hGCDH gene, or SV40 (e.g., SEQ ID NO: 28). In specific embodiments, the promoter component comprises or consists of a nucleotide sequence as shown in any one of SEQ ID NOs: 2-4.

In some embodiments, the promoter component of the present application comprises an EF-1α promoter, e.g., an EF-1α core promoter (e.g., SEQ ID NO: 29), and an intron-derived fragment. In this case, the intron-derived fragment is preferably an intron derived from the hGCDH gene, or a hybrid intron (e.g., SEQ ID NO: 32). In specific embodiments, the promoter component comprises or consists of a nucleotide sequence as shown in any one of SEQ ID NOs: 5-9. In a more preferred embodiment, the promoter component comprises or consists of a nucleotide sequence as shown in SEQ ID NO: 5 or 9.

In a preferred embodiment, the promoter component has a length of no more than 1,000 bp, no more than 900 bp, no more than 850 bp, no more than 800 bp, no more than 700 bp, no more than 600 bp, no more than 500 bp, or no more than 400 bp, due to the limited packaging capacity of AAV.

Expression Cassette

The term "expression cassette" herein refers to a DNA component included in a vector (e.g., rAAV vector) and consisted of a gene (e.g., human GCDH gene) to be expressed in a host cell transfected by the vector and regulatory sequence(s).

By optimizing cDNA sequence (codon) of the human GCDH gene, and the regulatory sequences, in particular the promoter component, the expression cassette of hGCDH inserted into an AAV vector can provide a desirable expression level and a reduced immunogenicity after the rAAV is delivered into a subject.

In one specific embodiment, the expression cassette comprises any of the coding sequences having a nucleotide sequence as shown in any of SEQ ID NOs: 11-18, preferably a nucleotide sequence as shown in SEQ ID NO: 12, operatively linked to a promoter component having a nucleotide sequence as shown in any of SEQ ID NOs: 2-9, preferably a nucleotide sequence as shown in SEQ ID NOs: 5 or 9. By "operatively linked", it means that the promoter component is in a functionally appropriate location and/or orientation in relation to the coding sequence so as to control the transcription of the coding sequence.

In specific embodiments, the expression cassette comprises or consists of a nucleotide sequence as shown in any one of SEQ ID NOs: 19-21, preferably as shown in SEQ ID NO: 20 or SEQ ID NO: 21.

Recombinant AAV Vectors and Viral Particles

The nucleic acid molecule or the expression cassette of the present disclosure can be constructed into a recombinant AAV (rAAV) vector, to obtain rAAV particles for delivery into a subject in need thereof.

In addition to the inserted nucleotide sequence as described above, the rAAV vectors are in self-complementary form. The rAAV vector is comprised of two inverted terminal repeat (ITR) sequences at both ends of the inserted nucleotide sequence. The ITR of the present disclosure can be ITR derived from any AAV serotypes. When reference is made to serotype of AAV ITR, the phrase "derived from" means that the ITR can be the ITR of a certain serotype or a variant derived therefrom with modification(s). In a preferred embodiment of the present disclosure, the rAAV vector comprises two ITRs derived from AAV2. For example, the rAAV vector comprises two AAV2 ITRs, or comprises a wild-type AAV2 ITR and a truncated version of AAV2 ITR lacking the region C or region C'. For example, the wild-type AAV2 ITR locates at the 5' of the inserted nucleotide sequence, while the AAV2 ITR variant locates at the 3' of the inserted nucleotide sequence; or vice versa. In one embodiment, the ITRs comprised in the rAAV of the present application have nucleotide sequences as shown in SEQ ID NO: 22 (5' ITR) and SEQ ID NO: 23 (3' ITR).

The rAAV genome was packaged into an AAV capsid. The capsid can be derived from any AAV serotype known in the art or characterized in the future. The capsid and ITRs can be derived from the same serotype of AAV or from different serotypes of AAV. For example, the capsid can be a capsid suitable for intravenous (IV) delivery (e.g., IV injection) to the peripheral tissues. The term "peripheral tissue" in the context of the present application refers to any tissue that is not a part of the brain or spinal cord. For example, the capsid can be a capsid suitable for the nervous system delivery, e.g., intrathecal, intracisterna magna, or intracerebroventricular delivery (e.g., by injection). In some embodiments, the AAV vector comprises a capsid of AAV1, AAV2, AAV4, AAV5, AAV7, AAV8, AAV9, AAVrh10, AAV PHP.B, AAV2.7m8, or AAVAnc80L65 serotype, or a variant thereof. In a preferred embodiment, the capsid is the AAV9 capsid.

Pharmaceutical Composition

The term "pharmaceutical composition" refers to a composition suitable for delivering to a subject. The pharmaceutical composition of the present disclosure comprises the isolated nucleic acid, the rAAV vector or the viral particle of the present disclosure and a pharmaceutically acceptable excipient. Conventional pharmaceutically acceptable excipients are known in the art and can be solid or liquid excipients. In one embodiment, the pharmaceutical composition can be a liquid for injection.

Delivery

The terms "administration", "administering", "treating" and "treatment" as used herein, when applied to a subject, e.g., an animal, including human, or to cell, tissue, organ, or biological fluid, means contact of an exogenous pharmaceutical, therapeutic, diagnostic agent, or composition with the subject, cell, tissue, organ, or biological fluid. Treatment of a cell encompasses contact of a reagent with the cell, as well as contact of a reagent with a fluid, where the fluid is in contact with the cell. The term "administration" and "treatment" also include in vitro and ex vivo treatments, e.g., of a cell, by a reagent, diagnostic, binding compound, or by another cell.

In some embodiments, the rAAV vector of the present application can be administered into a subject via systemic delivery or local delivery. In some embodiments, the rAAV vector of the present application can be delivered to peripheral tissues or organs rather than into the nervous system, e.g., into peripheral blood, via any parental or enteral route. For example, the rAAV vector of the present application can be administered by intravenous (IV), intramuscular (IM), subcutaneous (SC), intra-arterial, intraperitoneal (IP), intradermal, transdermal, oral, nasal or rectal route. In some embodiments, the rAAV vector of the present application can be delivered into the nervous system, e.g., into cerebrospinal fluid (CSF). For example, the rAAV vector of the present application can be administered by intracerebroventricular (ICV), intrathecal, or intracisterna magna (ICM) route. For example, the rAAV can be delivered by injection. In some embodiment, the rAAV vector can be delivered by a combined administration via more than one delivering route. For example, the rAAV vector can be delivered to both the peripheral tissues and the nervous system, successively or simultaneously.

The rAAV vector can be administered via a single dose or multiple doses. In a specific embodiment, the rAAV vector is administered via a single injection.

Therapeutic Uses

The term "treat", "treating" or "treatment" includes to cure or at least to alleviate the symptoms of a disorder or condition caused by GCDH deficiency, such as the symptoms of GA-I.

EXAMPLES

To facilitate the understanding and utilization of the present invention, the merits of the present invention will be described in more details with reference to examples and appended drawings. However, it should be understood that the following examples only intend to exemplify the present invention without any intention in limiting the scope of the present invention. The scope of the present invention should be defined by the claims.

Example 1. A Constitutive Promoter with Minimum of CPG Number for GCDH Protein Expression A GCDH expression AAV vector V1 was constructed and consists of ITRs, cmv enhancer/promoter (P0, SEQ ID NO: 1), wild type GCDH CDS and SV40 polyA. However, due to the silencing risk of CMV enhancer/promoter, the CMV enhancer/promoter was replaced by artificially synthesized promoter components P1-P8 (SEQ ID NOs: 2-9, respectively) to achieve more robust expression of GCDH. Each of the tested promoter components (P1-P8) includes an enhancer and/or an intron, in addition to a constitutive promoter. The specific structure of the promoter components P1-P8 are provided in Table 1. Illustration of the vector structure is shown in FIG. 1.

TABLE 1

Information of the promoter components P0-P8

| No. | |
|---|---|
| P0 | CMV enhancer (SEQ ID NO: 24)-CMV promoter (SEQ ID NO: 25) |
| P1 | CMV enhancer-chicken β-actin promoter (SEQ ID NO: 26) |
| P2 | CMV enhancer-chicken β-actin promoter-hGCDH intron 1 (SEQ ID NO: 27) |
| P3 | CMV enhancer-chicken β-actin promoter-SV40 intron (SEQ ID NO: 28) |
| P4 | EF-1α core promoter (SEQ ID NO: 29)-hGCDH intron 1 |
| P5 | EF-1α core promoter-hGCDH intron 2 (SEQ ID NO: 30) |
| P6 | EF-1α core promoter-hGCDH intron 3 (SEQ ID NO: 31) |
| P7 | EF-1α core promoter-hGCDH intron 1-hGCDH intron 2 |
| P8 | EF-1α core promoter-hybrid intron (SEQ ID NO: 32) |

U87 MG or HEK293 cells were maintained in DMEM+10% FBS and passaged every 3 days by TrypLE. The day before transfection, cells were inoculated to a 24-well plate in $1\times10^5/cm^2$. Plasmids were transfected into U87 MG or HEK293 cells using Lipofectamine 3000 Transfection Reagent (Invitrogen, L3000008) following the user's guide. 72 hours after transfection, cells were collected in RIPA lysis buffer (Beyotime, P0013C) with protease inhibitor cocktail (Roche, 04693159001) and SDS-PAGE loading buffer (Cowin Bio, CW0027), denatured for 10 min at 95° C., centrifuged at 12,000 rpm for 10 min. Supernatants were separated in 4%-10% SDS-PAGE gel (Cowin Bio, CW0022M), and blotted onto 0.2 μm PVDF transfer membrane (Merck, ISEQ00010). The protein levels of GCDH and housekeeping gene GAPDH were detected by an antibody against GCDH (Abcam, ab232774) and GAPDH (Cell Signaling Technology, 21185), respectively. The Western Blot images are shown in FIG. 2 and FIG. 3.

Figure 2:
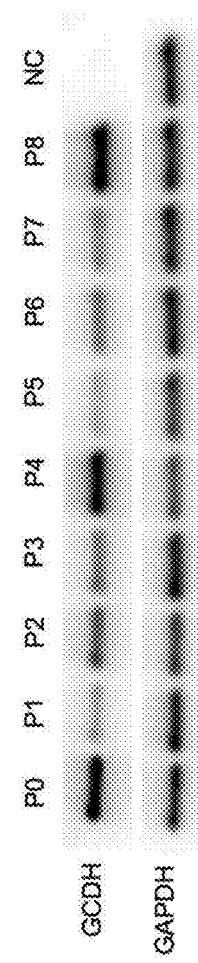
FIG. 2 shows the GCDH protein expression comparison of P0-P8 in U87 MG cells.
Figure 3:
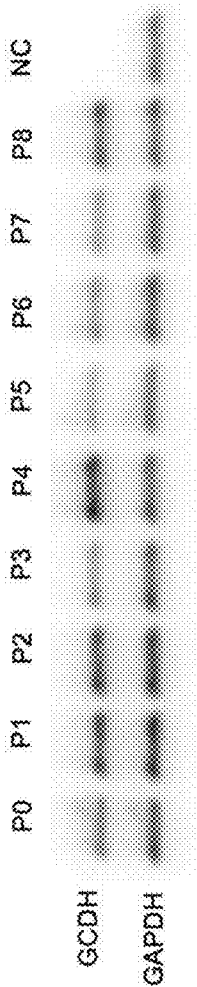
FIG. 3 shows the GCDH protein expression comparison of P0-P8 in HEK293 cells.

The results as shown in FIG. 2 and FIG. 3 suggest that P4 and P8 mediated the highest GCDH protein expression in both U87 MG and HEK293 cells.

Figure 4:
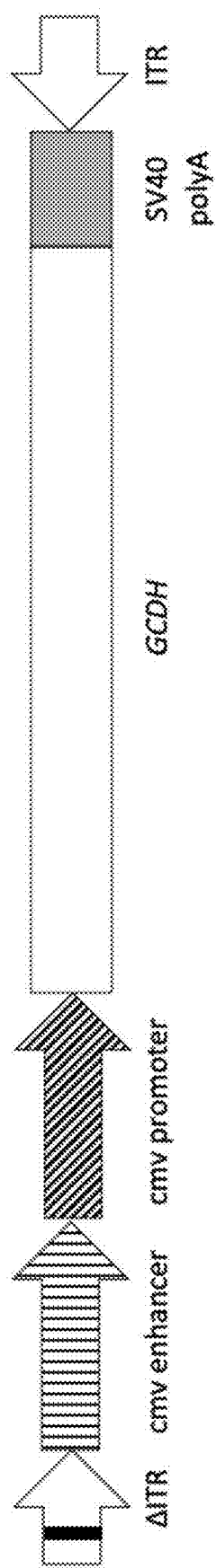
FIG. 4 shows the illustration of GCDH CDS evaluation vectors in Example 2.

Example 2. Codon Optimization to Minimize Immunogenicity Risks and Enhance Expression CpGs in AAV vectors have been reported to cause immunoreaction and exogenous gene silencing [10,11]. In this example, the coding sequence of GCDH was optimized to enhance expression and to reduce the numbers of CpGs, and the CMV promoter was used to test the expression efficiency of the codon optimized sequences. The vector structure is shown in FIG. 4. A total of eight different optimized coding sequences were synthesized, namely C1-C8, having nucleotide sequences as shown in SEQ ID NOs: 11-18. The CpG numbers of the modified coding sequences C1-C8 together with the wild-type coding sequence C0 are summarized in Table 2.

TABLE 2

CpG numbers of the codon optimized sequences C0-C8

| No. | CpG number | No. | CpG number | No. | CpG number |
|---|---|---|---|---|---|
| C0 | 73 | C3 | 30 | C6 | 46 |
| C1 | 51 | C4 | 70 | C7 | 33 |
| C2 | 16 | C5 | 65 | C8 | 46 |

To evaluate the expression of codon optimized sequences C1-C8, U87 MG cells were maintained in DMEM+10% FBS and passaged every 3 days by TrypLE. The day before transfection, cells were inoculated to 24-well plate in $1\times10^5/cm^2$. Plasmids were transfected into U87 MG using Lipofectamine 3000 Transfection Reagent (Invitrogen, L3000008) following the user's guide. 72 hours after transfection, cells were collected in RIPA lysis buffer (Beyotime, P0013C) with protease inhibitor cocktail (Roche, 04693159001) and SDS-PAGE loading buffer (Cowin Bio, CW0027), denatured for 10 min at 95° C., centrifuged at 12,000 rpm for 10 min. Supernatants were separated in 4%-10% SDS-PAGE gel (Cowin Bio, CW0022M), and blotted onto 0.2 μm PVDF transfer membrane (Merck, ISEQ00010). The protein levels of GCDH and housekeeping gene GAPDH were detected by an antibody against GCDH (Abcam, ab232774) and β-TUBULIN (Proteintech, 66240-1), respectively. The Western Blot images are shown in FIG. 5.

Figure 5:
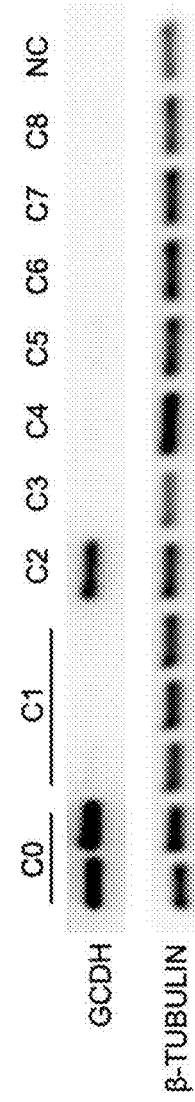
FIG. 5 shows the GCDH protein expression evaluation of C0-C8 in U87 MG cells.

The results as shown in FIG. 5 suggest that the codon optimized sequence C2 mediated the highest GCDH protein expression in the U87 MG cells.

Example 3. GCDH Constructs Comprising Optimized Promoter Component and Coding Sequence The codon optimized sequence C2 was identified in Example 2 as containing the best GCDH protein coding sequence. Therefore, C2 was combined with either of the top 2 promoter components identified in Example 1 (P4 and P8), resulting in two plasmid constructs V2 (P4-C2) and V3 (P8-C2) for further evaluation of GCDH protein expression efficiency. U87 MG cells were maintained in DMEM+10% FBS and passaged every 3 days by TrypLE. The day before transfection, cells were inoculated to 24-well plate in $1\times10^5/cm^2$. Plasmids of constructs V2 (P4-C2), V3 (P8-C2) and a control V1 (P0-C0) were transfected into U87 MG using Lipofectamine 3000 Transfection Reagent (Invitrogen, L3000008) following the user's guide. 72 hours after transfection, cells were collected in RIPA lysis buffer (Beyotime, P0013C) with protease inhibitor cocktail (Roche, 04693159001) and SDS-PAGE loading buffer (Cowin Bio, CW0027), denatured for 10 min at 95° C., centrifuged at 12,000 rpm for 10 min. Supernatants were separated in 4%-10% SDS-PAGE gel (Cowin Bio, CW0022M), and blotted onto 0.2 μm PVDF transfer membrane (Merck, ISEQ00010). The protein levels of GCDH and housekeeping gene GAPDH were detected by an antibody against GCDH (Abcam, ab232774) and β-TUBULIN (Proteintech, 66240-1), respectively. The Western Blot images are shown in FIG. 6.

Figure 6:
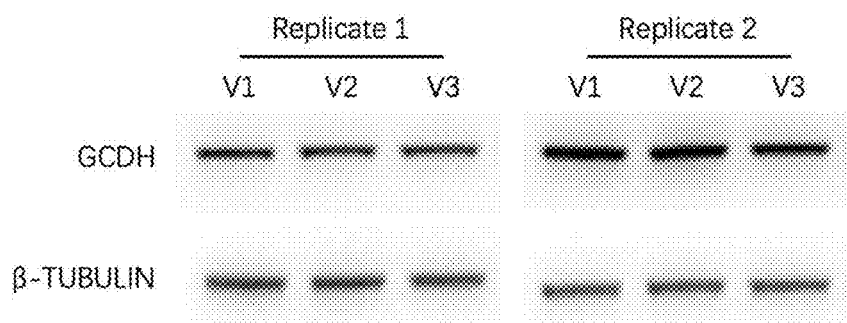
FIG. 6 shows the GCDH protein expression evaluation of V1-V3 in U87 MG cells.

The results as shown in FIG. 6 suggest that V1, V2 and V3 mediated similar GCDH protein expression levels in the U87 MG cells, indicating that V2 and V3 constructs could achieve comparable GCDH protein expression with the advantage of reduced CpG numbers in the coding sequences, as compared to V1.

Construct V2 was chosen for further study since V2 had a lower number of CpG than V3.

The enzymatic activities of the GCDH protein expressed by constructs V1 and V2 in the SH-sy5y cells were evaluated by incubating the cell lysates with glutaconyl-CoA and then measuring the catalytic product crotonyl-CoA by LC-MS/MS analysis, SH-sy5y cells were maintained in DMEM+10% FBS and passaged every 3 days by TrypLE. The day before transfection, cells were inoculated to 100 mm dish in $3\times10^6$/dish. Plasmids were transfected into SH-sy5y using jet Optimus reagent (Polyplus, 117-15) following the user's guide. 48 hours after transfection, cells were collected. Cells was adjusted to $3\times10^7$/mL and homogenized by ultrasound in cell lysis buffer (0.2 mM Flavin adenine dinucleotide disodium salt hydrate (Sigma, F6625-25MG), 1 mM L-Cysteine (Sangon Biotech, A600132-0100) in 1×PBS (Sangon Biotech, B540626-0500)). The total protein in the cell lysis buffer was measured by BCA Protein Quantification Kit (YEASEN, 20201ES76). The GCDH activity was measured by mixing 0.5 g total protein with GCDH reaction buffer [0.15 mM Glutaryl coenzyme A lithium salt (Sigma G9510-5MG), 0.5 mM L-Cysteine, 0.1 mM Flavin adenine dinucleotide disodium salt hydrate, 1 mM Phenazine methosulfate (Sigma, P9625-1G) in 1×PBS] to a final volume of 500 μL. The reaction mixture was incubated at 37° C. for different time points: 0 min, 5 min, 10 min, 15 min respectively and terminated by 500 μL of 7M Trichloroacetic acid (Sigma, T9159-100G). The GCDH activity was measured by the increase of crotonyl-CoA. The crotonyl-CoA produced in the reaction buffer was monitored and determined by LC-MS/MS. The time course of crotonyl-CoA production is shown in FIG. 7.

Figure 7:
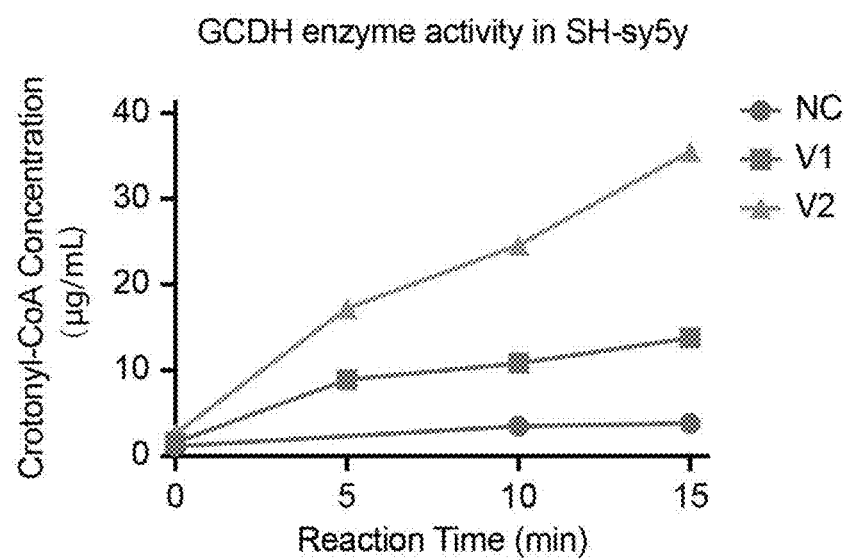
FIG. 7 shows the GCDH enzyme activity evaluation of V1-V3 in SH-sy5y cells.

As shown in FIG. 7, the GCDH protein expressed by V2 surprisingly mediated a significantly more rapid catalytic reaction as compared to the protein expressed by V1, suggesting that the optimized coding sequence of C2 expresses GCDH protein of increased enzymatic activity as compared to the protein expressed by construct V1 containing the wild-type coding sequence under the control of a CMV enhancer/promoter.

Example 4. In Vivo Proof-of-Concept Efficacy Study

Both V1 and V2 constructs were introduced into AAV9 vector to obtain rAAV9-V1 and rAAV9-V2 for evaluation of their in vivo efficacy in the Gcdh$^{-/-}$ mouse model.

Gcdh$^{-/-}$ mice under normal diet showed similar life expectancy to the wild-type C57BL/6 mice. However, under a 2-day high protein diet (HPD) challenge, half of 4-week-old Gcdh$^{-/-}$ mice would die within 3 days.

Within 24 h after birth, Gcdh$^{-/-}$ pups were injected (single-dose) intracerebroventricularly with rAAV9-V1 or rAAV9-V2 at doses of $4.38\times10^8$, $4.38\times10^9$, $4.38\times10^{10}$ vg, respectively. Pups injected with PBS were used as the control group. At 4 weeks post dosing, HPD was administered for 2 consecutive days, and the survival rate of each group was evaluated.

Figure 8:
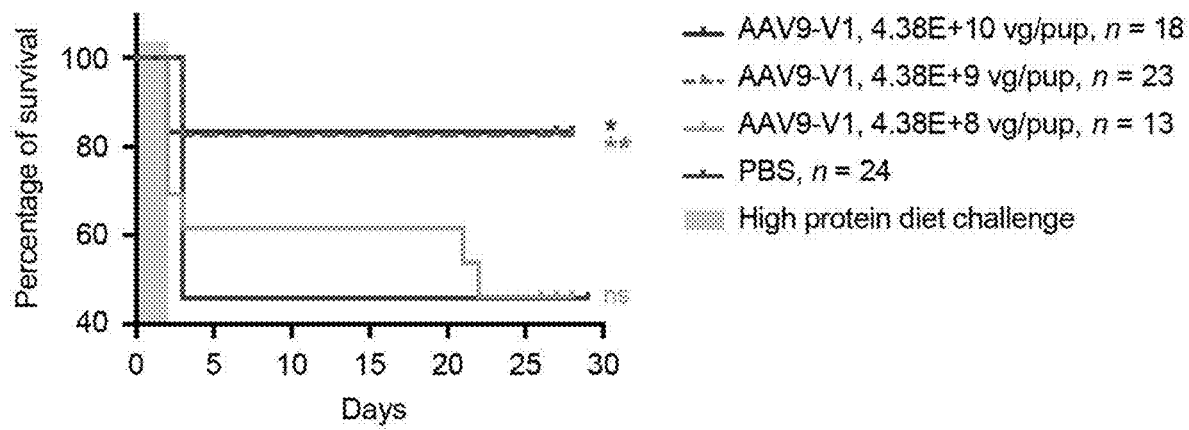
FIG. 8 shows the survival curves of the Gcdh$^{-/-}$ mice after administration of rAAV9-V1 under high protein diet challenge.
Figure 9:
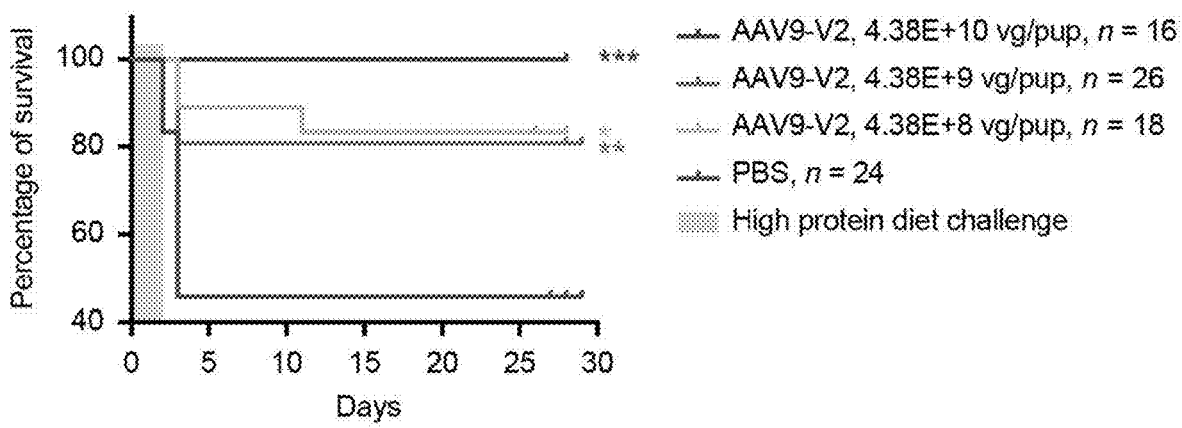
FIG. 9 shows the survival curves of the Gcdh$^{-/-}$ mice after administration of rAAV9-V2 under high protein diet challenge.

After intracerebroventricular administration of PBS, the survival rate of Gcdh$^{-/-}$ mice under HPD challenge was 46% (FIGS. 8 and 9). After intracerebroventricular administration of rAAV9-V1 at doses of $4.38\times10^8$, $4.38\times10^9$, $4.38\times10^{10}$ vg, respectively, the survival rates of Gcdh$^{-/-}$ mice under HPD challenge were 46%, 83% and 83%, respectively (FIG. 8). After intracerebroventricular administration of rAAV9-V2 at doses of $4.38\times10^8$, $4.38\times10^9$, $4.38\times10^{10}$ vg, respectively, the survival rates of Gcdh$^{-/-}$ mice under HPD challenge were 83%, 81% and 100%, respectively (FIG. 9). Treatment with rAAV9-V2 resulted in significantly higher survival rates of the HPD-challenged Gcdh$^{-/-}$ mice as compared to treatment with rAAV9-V1.

Figure 10:
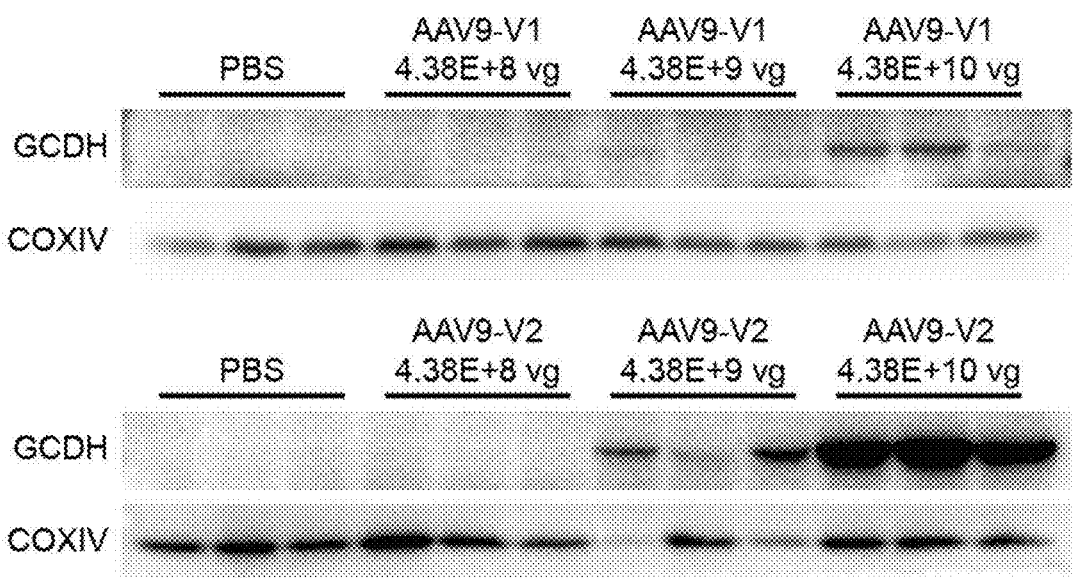
FIG. 10 shows the GCDH protein expression evaluation of rAAV9-V1 and rAAV9-V2 in Gcdh$^{-/-}$ mice.
Figure 10:
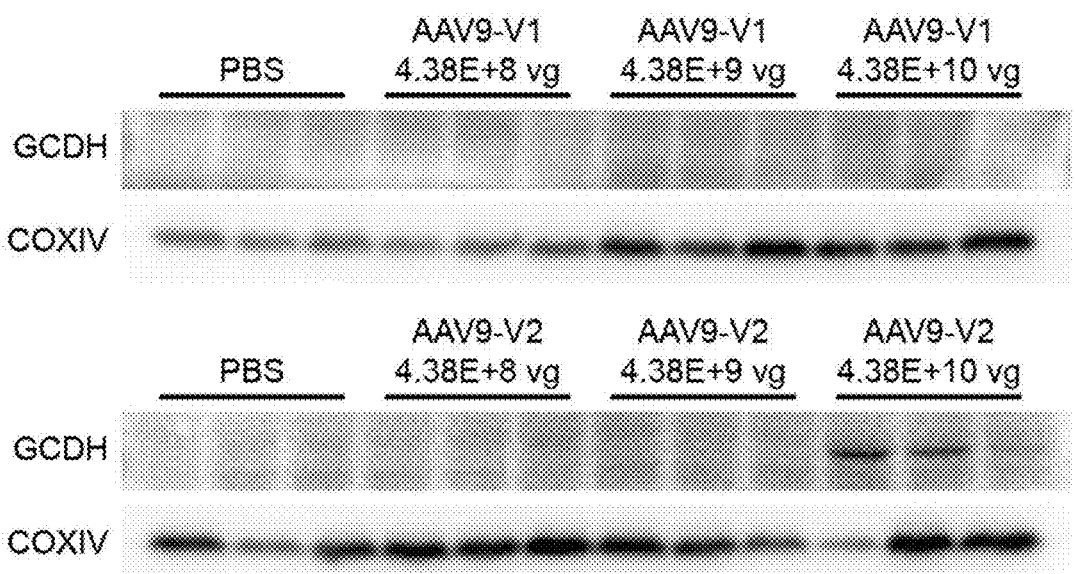

At 8 weeks after AAV administration, the surviving mice were sacrificed for brain, liver and plasma collection. Brain and liver tissues were homogenized and the mitochondria were isolated (QIAGEN, 37612). The mitochondria were collected in the RIPA lysis buffer (Beyotime, P0013C) with protease inhibitor cocktail (Roche, 04693159001) and SDS-PAGE loading buffer (Cowin Bio, CW0027), denatured for 10 min at 95° C., centrifuged at 12,000 rpm for 10 min. The supernatants were separated in 4%-10% SDS-PAGE gel (Cowin Bio, CW0022M), and blotted onto 0.2 μm PVDF transfer membrane (Merck, ISEQ00010). The protein levels of GCDH and housekeeping gene COXIV were detected by an antibody against GCDH (Abcam, ab232774) and COXIV (Abcam, ab16056), respectively. The Western Blot images are shown in FIG. 10. Brain GCDH expression was detected in a dose-dependent manner (FIG. 10). Since the mouse blood-brain barrier (BBB) was not mature at the time of AAV administration, liver GCDH expression can be detected in the highest dose group of rAAV9-V2 treatment, suggesting the AAV transferred across BBB from CNS to the peripheral tissues and organs (FIG. 10). The rAAV9-V2 mediated higher levels of GCDH protein expression than rAAV9-V1, indicating that higher levels of GCDH protein expression protected more Gcdh$^{-/-}$ mice from HPD challenge-induced death.

Figure 11:
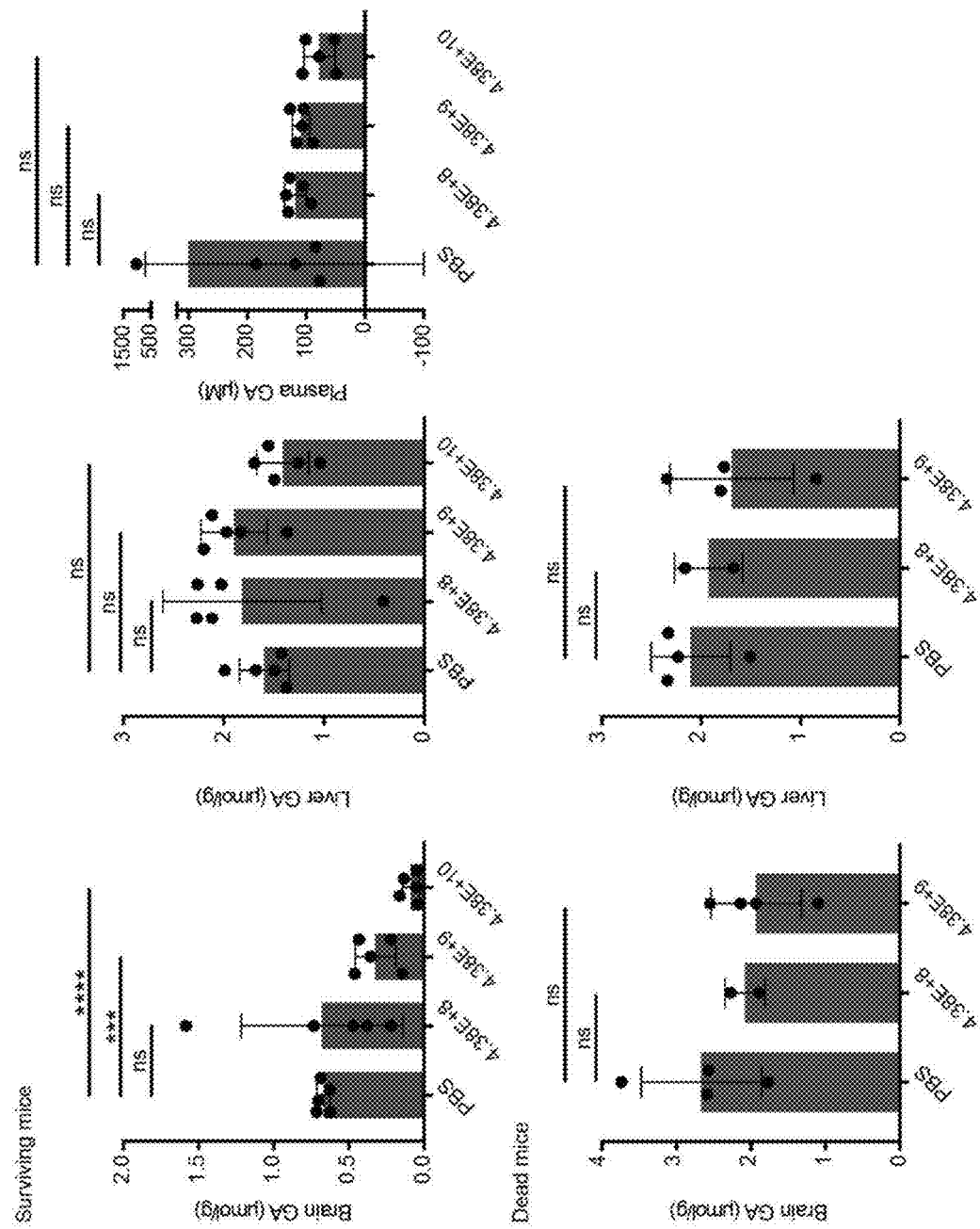
FIG. 11 shows the LC-MS analysis of GA levels in the brain, liver and plasma of the survived and dead Gcdh$^{-/-}$ mice after rAAV9-V2 administration.

For the Gcdh$^{-/-}$ mice that received rAAV9-V2 administration, liquid chromatography-mass spectrometry (LC-MS) analysis to measure the levels of GA showed that the GA levels significantly reduced in the brain dose-dependently (two-way ANOVA test was used for variance analysis) (FIG. 11). The liver and plasma GA levels between different treatment groups had no significant differences (FIG. 11). The brain and liver GA levels of the dead mice were also examined, and the results showed drastically elevated GA levels than the survived mice (FIG. 11). Taken the dead mice into consideration, ICV administration of rAAV9-V2 effectively reduced GA accumulation and improved the survival rate upon HPD challenge. It was also observed that the brain GA levels in the $4.38\times10^8$ vg treatment group had no significant difference but the survival rate was significantly improved, indicating that even moderate GA level reduction in the brain could protect the Gcdh$^{-/-}$ mice from acute encephalopathic crisis induced by HPD challenge, suggesting that it's more important to reduce the GA levels in the CNS than the peripheral tissues.

Example 5. Long-Term Efficacy Study

A long-term study was conducted to test endurance of the efficacy of rAAV9-V2. AAV9-V2 was intracerebroventricularly administrated into new born Gcdh$^{-/-}$ mice at doses of 0, 5×10$^8$, 2.5×10$^9$, 1×10$^{10}$ vg, respectively. Unlike the study described in Example 4, no HPD challenge was used in this study. 4 weeks and 13 weeks after the AAV administration, animals were sacrificed for biochemical and histopathologic analysis.

Figure 12:
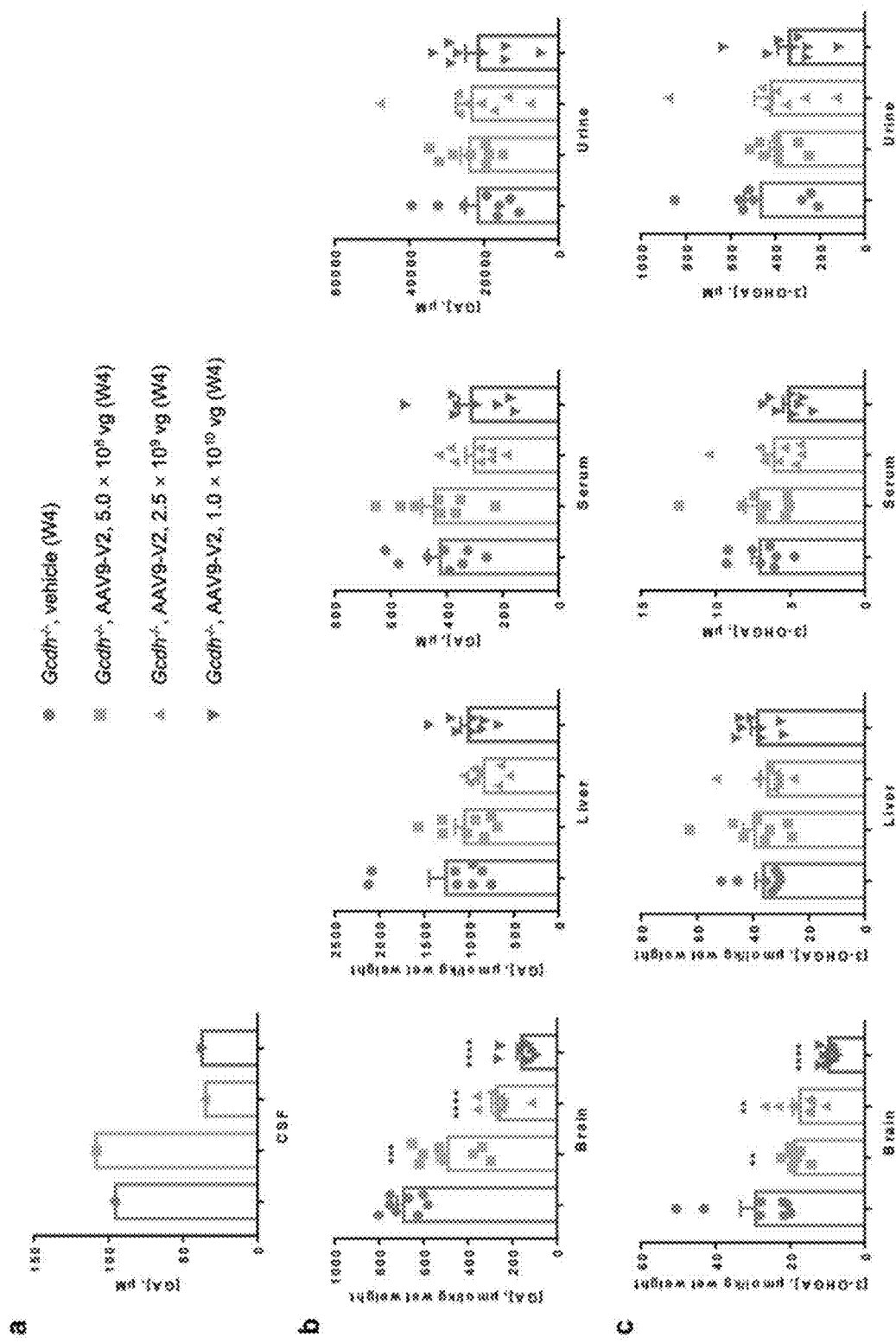
FIG. 12 shows the results of LC-MS/MS analysis of GA and 3-OHGA levels in different tissues (cerebrospinal fluid (only for GA), brain, liver, serum, and urine) at 4 weeks after AAV administration.
Figure 13:
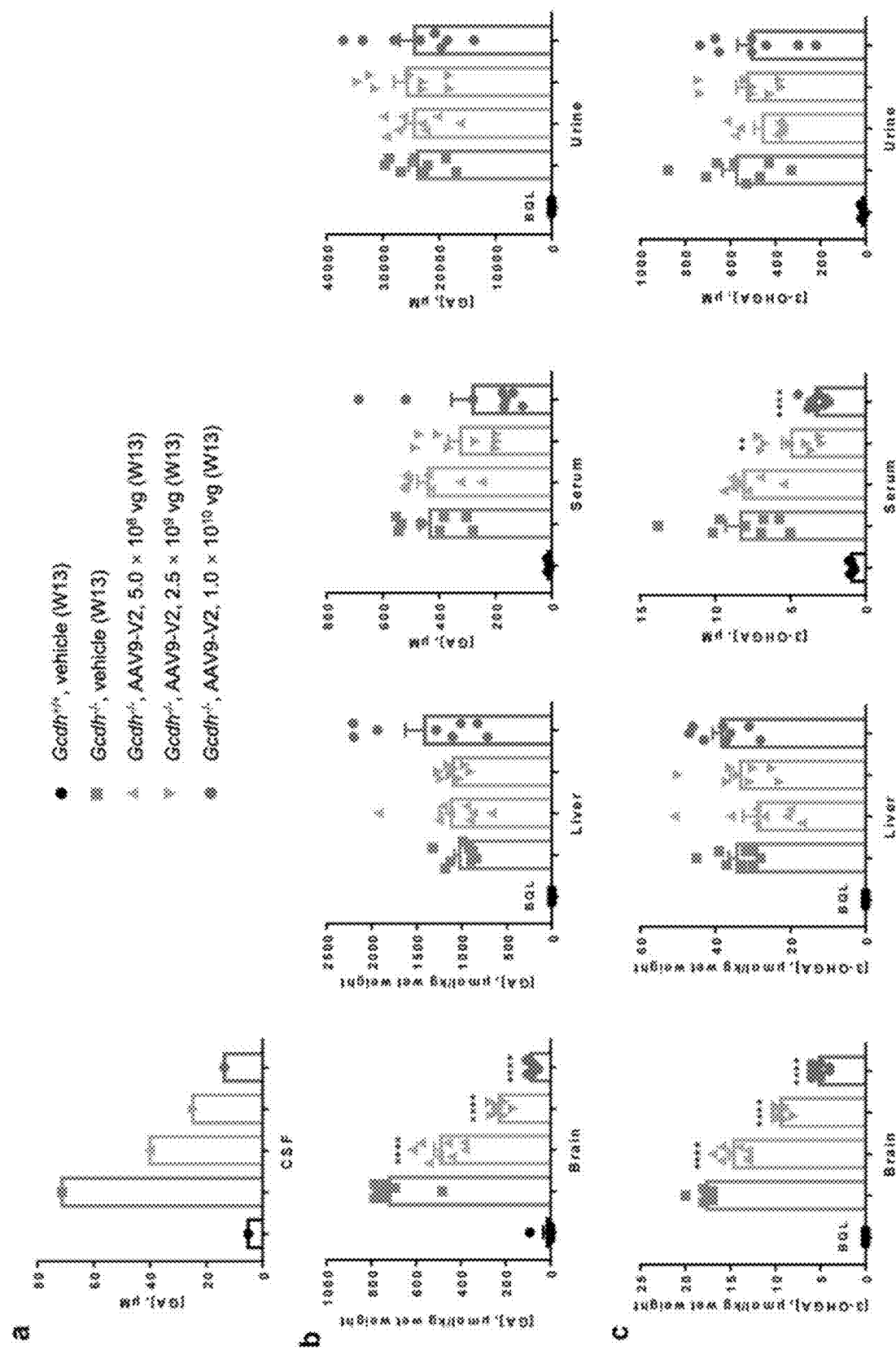
FIG. 13 shows the results of LC-MS/MS analysis of GA and 3-OHGA levels in different tissues (cerebrospinal fluid (only for GA), brain, liver, serum, and urine) at 13 weeks after AAV administration.

The levels of glutaric acid (GA) and 3-hydroxyglutaric acid (3-OHGA) were determined by liquid chromatography with tandem mass spectrometry (LC-MS/MS). FIG. 12 shows the results determined 4 weeks after AAV administration. As seen from FIG. 12, brain GA and 3-OHGA levels significantly decreased in a dose-dependent manner. CSF GA, serum GA and serum 3-OHGA levels showed a trend of dose-dependent decrease, yet no significance. GA and 3-OHGA levels in the liver and urine did not show obvious change. FIG. 13 shows the LC-MS/MS results measured 13 weeks after AAV administration. As seen from FIG. 13, brain GA and 3-OHGA levels significantly decreased in a dose-dependent manner. Serum GA and 3-OHGA level showed a trend of dose-dependent decrease, with the decrease of 3-OHGA level more significant. GA and 3-OHGA in the liver and urine did not show obvious change. CSF GA showed a trend of dose-dependent decrease (FIG. 13). Compared to the 4-week results, GA and 3-OHGA levels in the brain and serum, as well as GA level in the CSF showed even greater decrease at 13 weeks after AAV administration.

Figure 14:
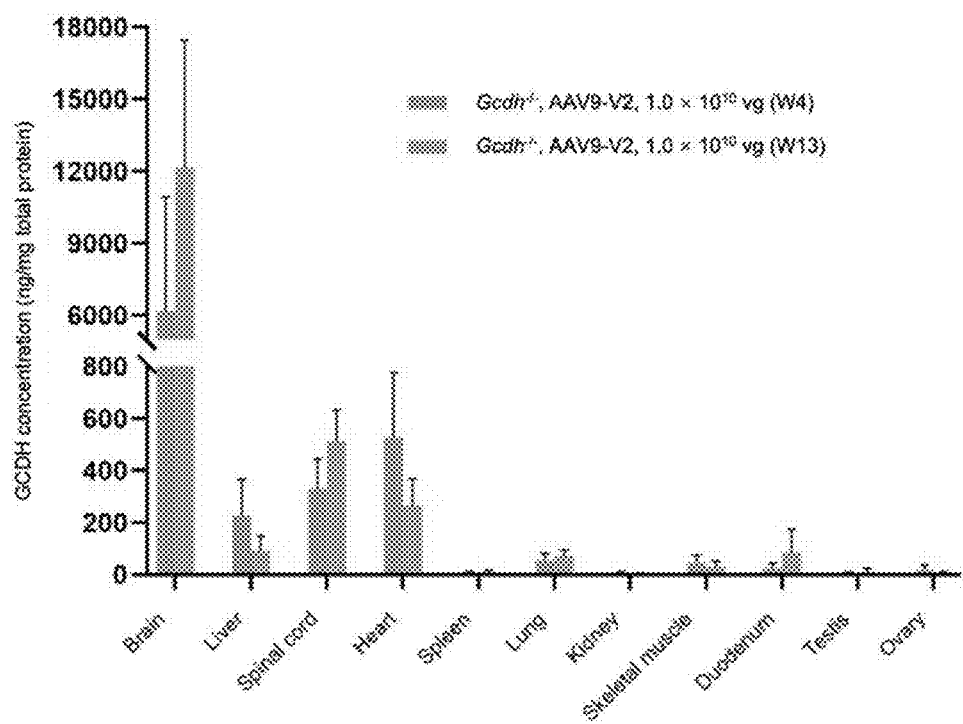
FIG. 14 shows the GCDH protein levels in different tissues of mice 4 weeks and 13 weeks after administering with a high dose (1.0×10$^{10}$ vg) of rAAV9-V2.

The expression of GCDH was determined by ELISA. After AAV administration, the expression of GCDH was most abundant in the brain, followed by the heart, spinal cord and liver (FIG. 14). The average brain GCDH concentration was 6,178.5 ng/mg total protein at 4 weeks after AAV administration, and 12,143.5 ng/mg total protein at 13 weeks after AAV administration. The average liver GCDH concentration was 227.0 ng/mg total protein at 4 weeks after AAV administration, and 92.2 ng/mg total protein at 13 weeks after AAV administration.

Figure 15:
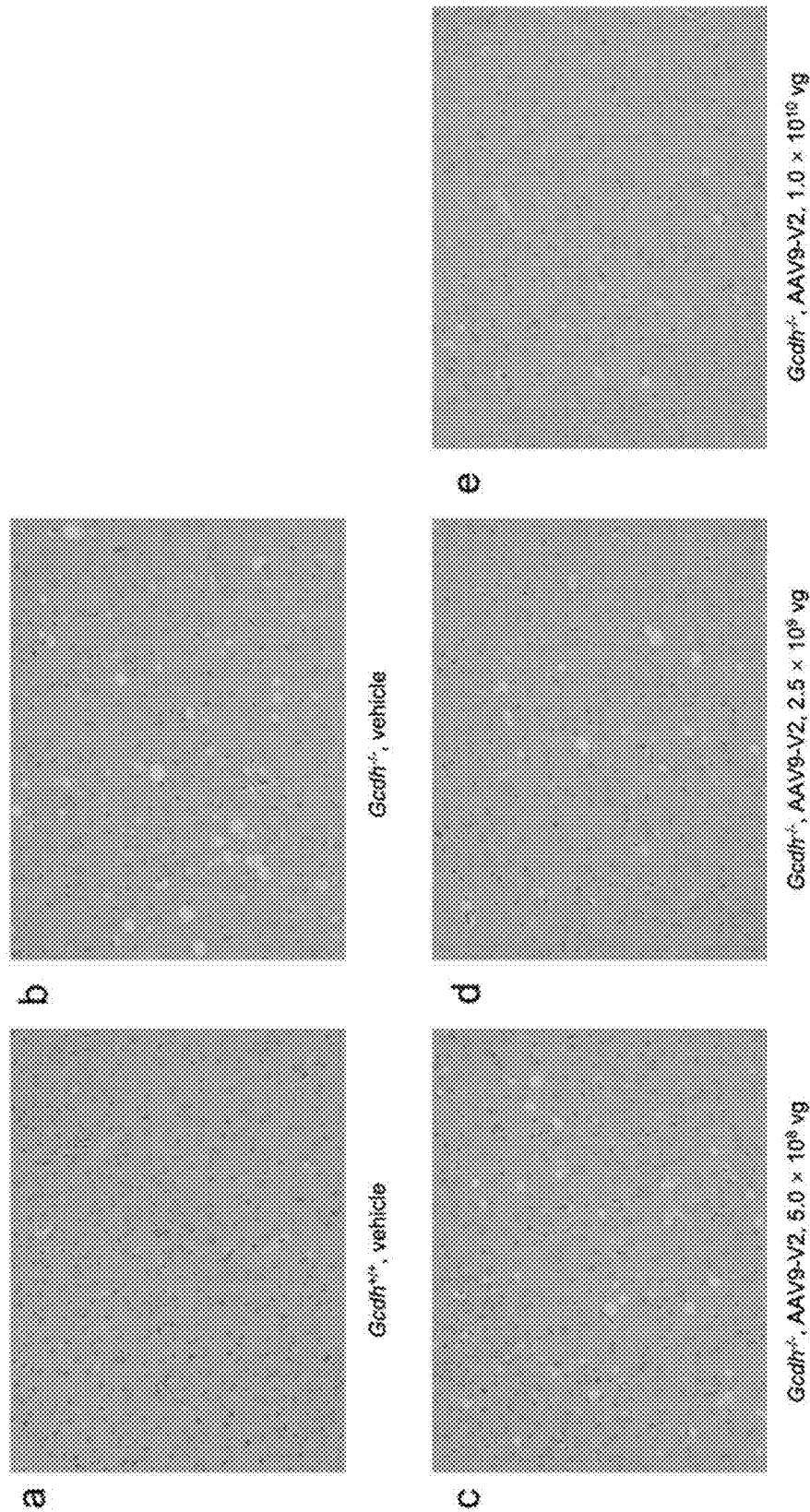
FIG. 15 shows the HE staining of mouse brain 13 weeks after administration of AAV or vehicle (200X).

Hematoxylin-eosin (HE) staining was used for evaluation of brain histopathology. Compared to the wild type mice, vacuolation could be observed in the cortex and striatum of the Gcdh$^{-/-}$ mice. After AAV administration, vacuolation decreased in a dose dependent manner (FIG. 15).

The results of this long term study validated the effect of AAV9-V2 in enhancing the expression of GCDH, especially in the brain, and the effects in decreasing the levels of GA and 3-OHGA in the CNS and also peripheral tissues. In addition, the results showed that long-term expression of GCDH by AAV9-V2 therapy could protect the CNS tissues from GCDH deficiency induced vacuolation. Therefore, this 13-week study provided strong evidence that AAV9-V2 could be an effective therapy for a sustained period of time.

REFERENCES

1. Goodman S I, Moe P, Markey S P, O'brien D. Glutaric acidemia: A new disorder of amino acid metabolism. Pediatric Research. 1974; 8: 389-389.
2. Goodman S I, Markey S P, Moe P G, Miles B S, Teng C C. Glutaric aciduria; a "new" disorder of amino acid metabolism. Biochemical medicine. 1975; 12: 12-21.
3. Goodman S I, Stein D E, Schlesinger S, Christensen E, Schwartz M, Greenberg C R et al. Glutaryl-coa dehydrogenase mutations in glutaric acidemia (type i): Review and report of thirty novel mutations. Human mutation. 1998; 12: 141-144.
4. Besrat A, Polan C E, Henderson L. Mammalian metabolism of glutaric acid. Journal of Biological Chemistry. 1969; 244: 1461-1467.
5. Kolker S, Christensen E, Leonard J, Greenberg C, Burlina A, Burlina A et al. Guideline for the diagnosis and management of glutaryl-coa dehydrogenase deficiency (glutaric aciduria type i). Journal of Inherited Metabolic Disease: Official Journal of the Society for the Study of Inborn Errors of Metabolism. 2007; 30: 5-22.
6. Ullrich K, Flott-Rahmel B, SchluffP, Musshoff U, Das A, Lücke T et al. Glutaric aciduria type i: Pathomechanisms of neurodegeneration. Journal of inherited metabolic disease. 1999; 22: 392-403.
7. Sauer S W, Okun J G, Fricker G, Mahringer A, Muller I, Crnic L R et al. Intracerebral accumulation of glutaric and 3-hydroxyglutaric acids secondary to limited flux across the blood-brain barrier constitute a biochemical risk factor for neurodegeneration in glutaryl-coa dehydrogenase deficiency. J Neurochem. 2006; 97: 899-910.
8. Koeller D M, Woontner M, Crnic L S, Kleinschmidt-Demasters B, Stephens J, Hunt E L et al. Biochemical, pathologic and behavioral analysis of a mouse model of glutaric acidemia type i. Human molecular genetics. 2002; 11: 347-357.
9. Zinnanti W J, Lazovic J, Wolpert E B, Antonetti D A, Smith M B, Connor J R et al. A diet-induced mouse model for glutaric aciduria type i. Brain. 2006; 129: 899-910.
10. Bertolini T B, Shirley J L, Zolotukhin I, Li X, Kaisho T, Xiao W et al. Effect of cpg depletion of vector genome on cd8+t cell responses in aav gene therapy. Frontiers in Immunology. 2021; 12.
11. Konkle B A, Walsh C E, Escobar M A, Josephson N C, Young G, Von Drygalski A et al. Bax 335 hemophilia b gene therapy clinical trial results: Potential impact of cpg sequences on gene expression. Blood, The Journal of the American Society of Hematology. 2021; 137: 763-774.

```
Sequence Information
>P0
                                                  (SEQ ID NO: 1)
GACATTGATTATTGACTAGTTATTAATAGTAATCAATTACGGGGTCATTAGTTCATAGCCCATATATGGAG

TTCCGCGTTACATAACTTACGGTAAATGGCCCGCCTGGCTGACCGCCCAACGACCCCCGCCCATTGAC

GTCAATAATGACGTATGTTCCCATAGTAACGCCAATAGGGACTTTCCATTGACGTCAATGGGTGGAGTA

TTTACGGTAAACTGCCCACTTGGCAGTACATCAAGTGTATCATATGCCAAGTACGCCCCCTATTGACGT

CAATGACGGTAAATGGCCCGCCTGGCATTATGCCCAGTACATGACCTTATGGGACTTTCCTACTTGGCA

GTACATCTACGTATTAGTCATCGCTATTACCATGGTGATGCGGTTTTGGCAGTACATCAATGGGCGTGG
```

```
                        -continued
ATAGCGGTTTGACTCACGGGGATTTCCAAGTCTCCACCCCATTGACGTCAATGGGAGTTTGTTTTGGC

ACCAAAATCAACGGGACTTTCCAAAATGTCGTAACAACTCCGCCCCATTGACGCAAATGGGCGGTAG

GCGTGTACGGTGGGAGGTCTATATAAGCAGAGCT

>P1
                                                        (SEQ ID NO: 2)
CGTTACATAACTTACGGTAAATGGCCCGCCTGGCTGACCGCCCAACGACCCCCGCCCATTGACGTCAA

TAATGACGTATGTTCCCATAGTAACGCCAATAGGGACTTTCCATTGACGTCAATGGGTGGAGTATTTAC

GGTAAACTGCCCACTTGGCAGTACATCAAGTGTATCATATGCCAAGTACGCCCCCTATTGACGTCAATG

ACGGTAAATGGCCCGCCTGGCATTATGCCCAGTACATGACCTTATGGGACTTTCCTACTTGGCAGTACA

TCTACGTATTAGTCATCGCTATTACCATGGTCGAGGTGAGCCCCACGTTCTGCTTCACTCTCCCCATCTC

CCCCCCCTCCCCACCCCCAATTTTGTATTTATTTATTTTTTAATTATTTTGTGCAGCGATGGGGGCGGGG

GGGGGGGGGGGCGCGCGCCAGGCGGGGCGGGGCGGGGCGAGGGCGGGGCGGGGCGAGGCGGA

GAGGTGCGGCGGCAGCCAATCAGAGCGGCGCGCTCCGAAAGTTTCCTTTTATGGCGAGGCGGCGGCG

GCGGCGGCCCTATAAAAAGCGAAGCGCGCGGCGGGCG

>P2
                                                        (SEQ ID NO: 3)
CGTTACATAACTTACGGTAAATGGCCCGCCTGGCTGACCGCCCAACGACCCCCGCCCATTGACGTCAA

TAATGACGTATGTTCCCATAGTAACGCCAATAGGGACTTTCCATTGACGTCAATGGGTGGAGTATTTAC

GGTAAACTGCCCACTTGGCAGTACATCAAGTGTATCATATGCCAAGTACGCCCCCTATTGACGTCAATG

ACGGTAAATGGCCCGCCTGGCATTATGCCCAGTACATGACCTTATGGGACTTTCCTACTTGGCAGTACA

TCTACGTATTAGTCATCGCTATTACCATGGTCGAGGTGAGCCCCACGTTCTGCTTCACTCTCCCCATCTC

CCCCCCCTCCCCACCCCCAATTTTGTATTTATTTATTTTTTAATTATTTTGTGCAGCGATGGGGGCGGGG

GGGGGGGGGGGCGCGCGCCAGGCGGGGCGGGGCGGGGCGAGGGCGGGGCGGGGCGAGGCGGA

GAGGTGCGGCGGCAGCCAATCAGAGCGGCGCGCTCCGAAAGTTTCCTTTTATGGCGAGGCGGCGGCG

GCGGCGGCCCTATAAAAAGCGAAGCGCGCGGCGGGCGGTAAGTTTAGTCTTTTTGTCTTTTATTTCAG

GTCCCGGATCCGGTGGTGGTGCAAATCAAAGAACTGCTCCTCAGTGGATGTTGCCTTTACTTCTAG

>P3
                                                        (SEQ ID NO: 4)
CGTTACATAACTTACGGTAAATGGCCCGCCTGGCTGACCGCCCAACGACCCCCGCCCATTGACGTCAA

TAATGACGTATGTTCCCATAGTAACGCCAATAGGGACTTTCCATTGACGTCAATGGGTGGAGTATTTAC

GGTAAACTGCCCACTTGGCAGTACATCAAGTGTATCATATGCCAAGTACGCCCCCTATTGACGTCAATG

ACGGTAAATGGCCCGCCTGGCATTATGCCCAGTACATGACCTTATGGGACTTTCCTACTTGGCAGTACA

TCTACGTATTAGTCATCGCTATTACCATGGTCGAGGTGAGCCCCACGTTCTGCTTCACTCTCCCCATCTC

CCCCCCCTCCCCACCCCCAATTTTGTATTTATTTATTTTTTAATTATTTTGTGCAGCGATGGGGGCGGGG

GGGGGGGGGGGCGCGCGCCAGGCGGGGCGGGGCGGGGCGAGGGCGGGGCGGGGCGAGGCGGA

GAGGTGCGGCGGCAGCCAATCAGAGCGGCGCGCTCCGAAAGTTTCCTTTTATGGCGAGGCGGCGGCG

GCGGCGGCCCTATAAAAAGCGAAGCGCGCGGCGGGCGGTCAGTGTGGGTCGGGAGTGTGGAGGGA

AGGAGGGAGGAACTGGGGGTTTAGGGACTTTCCGGGGTGACTTTCCCGTTCTGTGCTTGCAG

>P4
                                                        (SEQ ID NO: 5)
GGCTCCGGTGCCCGTCAGTGGGCAGAGCGCACATCGCCCACAGTCCCCGAGAAGTTGGGGGAGGG

GTCGGCAATTGAACGGGTGCCTAGAGAAGGTGGCGCGGGGTAAACTGGGAAAGTGATGTCGTGTACT

GGCTCCGCCTTTTTCCCGAGGGTGGGGAGAACCGTATATAAGTGCAGTAGTCGCCGTGAACGTTCTT

TTTCGCAACGGGTTTGCCGCCAGAACACAGGTCAGTGTGGGTCGGGAGTGTGGAGGGAAGGAGGG

AGGAACTGGGGGTTTAGGGACTTTCCGGGGTGACTTTCCCGTTCTGTGCTTGCAG
```

-continued

>P5
(SEQ ID NO: 6)
GGCTCCGGTGCCCGTCAGTGGGCAGAGCGCACATCGCCCACAGTCCCCGAGAAGTTGGGGGGAGGG

GTCGGCAATTGAACGGGTGCCTAGAGAAGGTGGCGCGGGGTAAACTGGGAAAGTGATGTCGTGTACT

GGCTCCGCCTTTTTCCCGAGGGTGGGGGAGAACCGTATATAAGTGCAGTAGTCGCCGTGAACGTTCTT

TTTCGCAACGGGTTTGCCGCCAGAACACAGGTAAGGACCTCTGGTCGCACCGTGTGTCTGCTGCCCC

TGTTCAGCTGTCTGTCTGCCGCAGGTGGACTCTGTCCCAGAATCCGAGAGCTGCCCGAGCGGGGTGG

CAGGGTCGTGGCCAGGGTCAGAGGCACTAAGGCAGTGAGTGCGCTGTGCCTGCGGGGCCGGAGAAA

AGTCACCTGATCAGTCTCGCTTGCAGCTCGCACTAGCCGGGGGGCGACATGGGTGTTGGGGGGTAGG

GCTGATGAGGGTCCGAGAAGGGAGGGCACAGTGATCTTGCGGACTGGACCGAGGCGAATTCCCCTTC

CCAG

>P6
(SEQ ID NO: 7)
GGCTCCGGTGCCCGTCAGTGGGCAGAGCGCACATCGCCCACAGTCCCCGAGAAGTTGGGGGGAGGG

GTCGGCAATTGAACGGGTGCCTAGAGAAGGTGGCGCGGGGTAAACTGGGAAAGTGATGTCGTGTACT

GGCTCCGCCTTTTTCCCGAGGGTGGGGGAGAACCGTATATAAGTGCAGTAGTCGCCGTGAACGTTCTT

TTTCGCAACGGGTTTGCCGCCAGAACACAGGTGGGCGGGCTGGTGGGTGCCCTGAGACTGCTCCTCC

GCCTGGAGCCATAGCCACCCCACCTCAAGGCCCCTCTGTCCTTGGGGCTGGGGCTTCCTGTGGCCTAG

GCCTGGGCCTGAATTTGGGCACTGGTCCCTTTGCAG

>P7
(SEQ ID NO: 8)
GGCTCCGGTGCCCGTCAGTGGGCAGAGCGCACATCGCCCACAGTCCCCGAGAAGTTGGGGGGAGGG

GTCGGCAATTGAACGGGTGCCTAGAGAAGGTGGCGCGGGGTAAACTGGGAAAGTGATGTCGTGTACT

GGCTCCGCCTTTTTCCCGAGGGTGGGGGAGAACCGTATATAAGTGCAGTAGTCGCCGTGAACGTTCTT

TTTCGCAACGGGTTTGCCGCCAGAACACAGGTCAGTGTGGGTCGGGAGTGTGGAGGGAAGGAGGG

AGGAACTGGGGGTTTAGGGACTTTCCGGGGTGACTTTCCCGTTCTGTGCTTGCAGGTAAGGACCTCT

GGTCGCACCGTGTGTCTGCTGCCCCTGTTCAGCTGTCTGTCTGCCGCAGGTGGACTCTGTCCCAGAAT

CCGAGAGCTGCCCGAGCGGGTGGCAGGGTCGTGGCCAGGGTCAGAGGCACTAAGGCAGTGAGTGC

GCTGTGCCTGCGGGGCCGGAGAAAAGTCACCTGATCAGTCTCGCTTGCAGCTCGCACTAGCCGGGGG

GCGACATGGGTGTTGGGGGGTAGGGCTGATGAGGGTCCGAGAAGGGAGGGCACAGTGATCTTGCGG

ACTGGACCGAGGCGAATTCCCCTTCCCAG

>P8
(SEQ ID NO: 9)
GGCTCCGGTGCCCGTCAGTGGGCAGAGCGCACATCGCCCACAGTCCCCGAGAAGTTGGGGGGAGGG

GTCGGCAATTGAACGGGTGCCTAGAGAAGGTGGCGCGGGGTAAACTGGGAAAGTGATGTCGTGTACT

GGCTCCGCCTTTTTCCCGAGGGTGGGGGAGAACCGTATATAAGTGCAGTAGTCGCCGTGAACGTTCTT

TTTCGCAACGGGTTTGCCGCCAGAACACAGGGAGTCGCTGCGACGCTGCCTTCGCCCCGTGCCCCGC

TCCGCCGCCGCCTCGCGCCGCCCGCCCCGGCTCTGACTGACCGCGTTACTCCCACAGGTGAGCGGGC

GGGACGGCCCTTCTCCTCCGGGCTGTAATTAGCTGAGCAAGAGGTAAGGGTTTAAGGGATGGTTGGTT

GGTGGGGTATTAATGTTTAATTACCTGGAGCACCTGCCTGAAATCACTTTTTTTCAG

>C0
(SEQ ID NO: 10)
ATGGCCCTGAGAGGCGTCTCCGTGCGGCTGCTGAGCCGCGGACCCGGCCTGCACGTCCTTCGCACGT

GGGTCTCGTCGGCGGCGCAGACCGAGAAAGGCGGGAGAACACAGAGCCAACTGGCTAAGTCCTCGC

GTCCCGAGTTTGACTGGCAGGACCCGCTGGTGCTGGAGGAGCAGCTGACCACAGATGAGATCCTCAT

-continued

```
CAGGGACACCTTCCGCACCTACTGCCAGGAGAGACTCATGCCTCGCATCCTGTTGGCCAATCGCAAC

GAAGTTTTTCATCGGGAGATCATTTCGGAGATGGGGGAGTTGGGTGTGCTGGGCCCCACCATCAAAG

GATATGGCTGTGCTGGGGTTTCGTCTGTGGCCTATGGGCTCCTGGCCCGAGAGCTGGAGCGGGTGGAC

AGTGGCTACAGGTCGGCGATGAGTGTCCAGTCCTCCCTCGTCATGCACCCTATCTATGCCTATGGCAGC

GAGGAACAGCGGCAGAAGTACCTGCCCCAGCTGGCCAAGGGGGAGCTCCTGGGCTGCTTCGGGCTC

ACAGAGCCCAACAGCGGAAGTGACCCCAGCAGCATGGAGACCAGAGCCCACTACAACTCATCCAAC

AAGAGCTACACCCTCAATGGGACCAAGACCTGGATCACGAACTCGCCTATGGCCGATCTGTTTGTAGT

GTGGGCTCGGTGTGAAGATGGCTGCATTCGGGGCTTCCTGCTGGAGAAGGGGATGCGGGGTCTCTCG

GCCCCCAGGATCCAGGGCAAGTTCTCGCTGCGGGCCTCAGCCACAGGCATGATCATCATGGACGGTG

TGGAGGTGCCAGAGGAGAATGTGCTCCCTGGTGCATCCAGCCTGGGGGGTCCCTTCGGCTGCCTGAA

CAACGCCCGGTACGGCATCGCGTGGGCGTGCTTGGAGCTTCGGAGTTCTGCTTGCACACAGCCCGG

CAGTACGCCCTCGACAGGATGCAGTTTGGTGTCCCACTGGCCAGGAACCAGCTGATTCAGAAGAAGC

TGGCAGACATGCTCACTGAGATTACCCTGGGCCTTCACGCCTGCCTGCAGCTCGGCCGCTTGAAGGA

CCAGGACAAGGCTGCCCCCGAGATGGTTTCTCTGCTGAAGAGGAATAACTGTGGGAAAGCCCTGGAC

ATCGCCCGCCAGGCCCGAGACATGCTGGGGGGAATGGGATTTCTGACGAGTATCACGTGATCCGGC

ACGCCATGAACCTGGAGGCCGTGAACACCTACGAAGGTACACATGACATTCACGCCCTGATCCTTGG

GAGAGCTATCACGGGAATCCAGGCGTTCACGGCCAGCAAGTAA

>C1                                                        (SEQ ID NO: 11)
ATGGCCCTGAGAGGCGTGTCCGTCAGACTGCTGAGCAGAGGCCCTGGCCTGCATGTGCTCAGAACCT

GGGTCAGCAGCGCTGCTCAAACAGAAAAGGGGGGCAGAACACAAAGCCAACTGGCTAAGAGCAGC

AGACCTGAATTCGATTGGCAAGACCCCCTGGTCCTGGAAGAACAGCTGACAACAGACGAGATTCTGA

TTAGAGACACATTCAGAACATATTGCCAAGAAAGACTGATGCCTAGAATCCTGCTGGCCAACAGAAAT

GAAGTGTTTCATCGGGAAATCATTAGCGAGATGGGCGAGCTGGGCGTGCTGGGCCCCACCATTAAGG

GCTACGGCTGTGCTGGGGTGTCCTCCGTGGCCTATGGCCTCCTGGCTAGAGAACTCGAAAGAGTCGAT

AGCGGCTACAGAAGCGCTATGAGCGTGCAGAGCAGCCTGGTGATGCATCCTATCTATGCTTATGGCAG

CGAAGAGCAGAGACAAAAGTATCTGCCTCAGCTGGCTAAGGGCGAGCTGCTCGGCTGCTTCGGGCTG

ACAGAACCCAATAGCGGGTCCGATCCTAGCAGCATGGAGACAAGAGCTCATTATAATAGCAGCAACA

AGAGCTATACCCTGAACGGGACAAAAACATGGATCACAAATAGCCCTATGGCTGACCTGTTTGTGGTG

TGGGCCAGATGTGAGGATGGCTGTATCAGAGGCTTTCTGCTGGAGAAGGGCATGCGGGGCTGTCCG

CTCCTAGAATCCAAGGCAAATTTAGCCTGAGAGCTAGCGCTACAGGCATGATTATTATGGACGGCGTC

GAGGTGCCTGAGGAAATGTGCTGCCTGGCGCTAGCAGCCTGGGCGGCCTTTCGGCTGCCTGAATA

ACGCTAGATATGGCATCGCCTGGGGGTGCTGGGCGCCTCCGAGTTTTGTCTGCACACAGCTAGACAG

TATGCCCTGGACAGAATGCAATTCGGGGTGCCCCTGGCTAGAAATCAGCTGATTCAAAAGAAACTGG

CTGACATGCTGACAGAAATTACACTCGGCCTCCATGCCTGTCTGCAGCTGGGCAGACTCAAAGATCA

AGATAAGGCTGCCCCTGAAATGGTCAGCCTGCTCAAAAGAAACAATTGCGGCAAAGCTCTGGATATC

GCTAGACAAGCTAGAGATATGCTCGGCGGCAACGGGATTAGCGACGAGTATCATGTGATCAGACACGC

TATGAATCTGGAAGCCGTGAACACCTATGAAGGCACACACGACATCCACGCTCTGATCCTCGGGAGA

GCTATCACCGGCATTCAAGCCTTCACAGCTAGCAAGTAA

>C2                                                        (SEQ ID NO: 12)
ATGGCTCTGAGAGGGGTGAGCGTCAGACTGCTGAGCAGAGGCCCTGGCCTGCATGTGCTGAGAACAT

GGGTGTCCAGCGCTGCTCAGACAGAGAAGGGGGGCAGAACACAGAGCCAACTGGCCAAGAGCAGC
```

```
AGACCTGAATTTGACTGGCAAGACCCCCTGGTCCTGGAGGAGCAGCTGACCACAGATGAGATCCTGA

TCAGAGACACCTTCAGAACCTACTGCCAAGAGAGACTGATGCCTAGAATCCTGCTGGCCAACAGAAA

TGAGGTCTTCCACAGAGAAATCATTAGCGAGATGGGGGAGCTGGGGGTGCTGGGCCCTACAATCAAG

GGCTATGGCTGTGCTGGGGTGAGCAGCGTGGCCTATGGCCTGCTGGCTAGAGAGCTGGAGAGAGTGG

ACAGCGGGTACAGAAGCGCTATGAGCGTGCAGAGCAGCCTGGTCATGCACCCCATCTATGCCTATGGC

AGCGAGGAGCAGAGACAGAAATATCTCCCTCAGCTGGCCAAGGGGGAGCTGCTGGGCTGCTTTGGC

CTCACAGAGCCCAATAGCGGCAGCGACCCTAGCAGCATGGAGACAAGAGCCCACTACAACAGCAGC

AACAAGAGCTACACCCTGAATGGCACCAAGACATGGATCACAAACAGCCCCATGGCTGATCTCTTTG

TGGTCTGGGCTAGATGTGAGGATGGCTGTATCAGAGGCTTTCTCCTGGAGAAGGGCATGAGAGGCCT

GAGCGCTCCTAGAATCCAAGGCAAATTCAGCCTCAGAGCTTCCGCCACCGGGATGATCATCATGGATG

GGGTGGAGGTCCCTGAGGAGAATGTGCTGCCTGGGGCTAGCTCCTGGGGGGCCCCTTTGGCTGTCT

CAATAATGCTAGATATGGCATTGCCTGGGGGGTGCTGGGGGCCAGCGAGTTCTGCCTGCATACAGCTA

GACAATATGCCCTGGACAGAATGCAGTTTGGGGTGCCCCTGGCTAGAAATCAGCTGATTCAGAAGAA

GCTGGCTGACATGCTGACAGAGATCACACTGGGCCTGCATGCCTGTCTGCAGCTGGGGAGACTGAAG

GACCAAGATAAGGCTGCCCCTGAGATGGTGAGCCTGCTGAAGAGAAATAACTGTGGGAAAGCTCTGG

ACATTGCTAGACAAGCTAGAGACATGCTGGGGGGCAATGGCATCTCCGATGAGTACCATGTCATCAGA

CATGCCATGAACCTGGAGGCTGTGAACACCTATGAGGGCACACATGACATCCATGCCCTGATCCTGGG

CAGAGCCATCACCGGCATCCAAGCCTTCACAGCTAGCAAGTGA

>C3                                                                (SEQ ID NO: 13)
ATGGCCCTGAGAGGCGTCTCCGTGAGGCTGCTGAGCAGAGGACCTGGCCTGCATGTCCTTAGAACGT

GGGTCTCGTCGGCGGCGCAGACCGAGAAAGGCGGGAGAACACAGAGCCAACTGGCTAAGTCCTCGC

GTCCTGAGTTTGACTGGCAGGACCCGCTGGTGCTGGAGGAGCAGCTGACCACAGATGAGATCCTCAT

CAGGGACACCTTCAGAACCTACTGCCAGGAGAGACTCATGCCTAGAATCCTGTTGGCCAATAGAAAT

GAAGTTTTTCATAGGGAGATCATTTCGGAGATGGGGGAGTTGGGTGTGCTGGGCCCCACCATCAAAG

GATATGGCTGTGCTGGGGTTTCGTCTGTGGCCTATGGGCTCCTGGCCCGAGAGCTGGAGAGGGTGGA

CAGTGGCTACAGGTCGGCGATGAGTGTCCAGTCCTCCCTTGTCATGCACCCTATCTATGCCTATGGCAG

TGAGGAACAGAGGCAGAAGTACCTGCCCCAGCTGGCCAAGGGGGAGCTCCTGGGCTGCTTTGGGCT

CACAGAGCCCAACTCTGGAAGTGACCCCAGCAGCATGGAGACCAGAGCCCACTACAACTCATCCAA

CAAGAGCTACACCCTCAATGGGACCAAGACCTGGATCACGAACTCGCCTATGGCCGATCTGTTTGTAG

TGTGGGCTAGGTGTGAAGATGGCTGCATTAGGGGCTTCCTGCTGGAGAAGGGGATGAGGGGTCTCTC

GGCCCCCAGGATCCAGGGCAAGTTCTCGCTGAGGGCCTCAGCCACAGGCATGATCATCATGGATGGT

GTGGAGGTGCCAGAGGAGAATGTGCTCCCTGGTGCATCCAGCCTGGGGGTCCCTTTGGCTGCCTGA

ACAATGCCAGGTATGGCATTGCGTGGGCGTGCTTGGAGCTTCGGAGTTCTGCTTGCACACAGCCAG

GCAGTATGCCCTTGACAGGATGCAGTTTGGTGTCCCACTGGCCAGGAACCAGCTGATTCAGAAGAAG

CTGGCAGACATGCTCACTGAGATTACCCTGGGCCTTCATGCCTGCCTGCAGCTTGGCAGATTGAAGGA

CCAGGACAAGGCTGCCCCTGAGATGGTTTCTCTGCTGAAGAGGAATAACTGTGGGAAAGCCCTGGAC

ATTGCCAGACAGGCCCGAGACATGCTGGGGGGGAATGGGATTTCTGATGAGTATCATGTGATCAGGCA

TGCCATGAACCTGGAGGCCGTGAACACCTATGAAGGTACACATGACATTCATGCCCTGATCCTTGGGA

GAGCTATCACGGGAATCCAGGCGTTCACGGCCAGCAAGTAA
```

-continued

>C4
(SEQ ID NO: 14)
ATGGCCCTGAGAGGCGTCTCCGTGCGGCTGCTGAGCCGCGGACCCGGCCTGCACGTCCTTCGCACGT

GGGTCTCGTCGGCGGCGCAGACCGAGAAAGGCGGGAGAACACAGAGCCAACTGGCTAAGTCCTCGA

GGCCCGAGTTTGACTGGCAGGACCCCCTGGTGCTGGAGGAGCAGCTGACAACCGATGAGATCCTGAT

CAGGGATACCTTCAGAACCTACTGTCAGGAGAGGCTGATGCCCAGGATCCTGCTGGCCAACAGAAAC

GAGGTGTTCCACAGAGAGATCATCAGCGAGATGGGCGAGCTGGGCGTGCTGGGCCCTACAATCAAGG

GCTACGGCTGCGCCGGCGTGAGCAGCGTTGCCTACGGCCTGCTGGCCAGGGAGCTGGAGAGAGTGG

ATTCCGGCTACAGAAGCGCCATGAGCGTGCAGAGCTCCCTGGTCATGCACCCTATCTACGCCTACGGC

AGCGAGGAGCAGAGACAGAAGTACCTGCCCCAGCTGGCCAAAGGCGAGCTGCTGGGCTGCTTCGGC

CTGACAGAGCCTAATTCCGGCTCCGACCCCAGCTCCATGGAGACCAGAGCCCACTACAATAGCTCCA

ATAAGAGCTACACACTGAACGGCACAAAGACCTGGATCACAAACAGCCCCATGGCCGACCTGTTTGT

GGTGTGGGCCAGGTGTGAGGATGGCTGTATCAGGGGCTTTCTGCTGGAGAAGGGCATGAGAGGCCTG

TCCGCCCCCAGGATCCAGGGCAAGTTTAGCCTGAGAGCCAGCGCCACCGGCATGATCATCATGGATG

GCGTGGAGGTGCCCGAGGAGAACGTGCTGCCTGGCGCCAGCAGCCTGGGCGGACCTTTTGGCTGCC

TGAACAATGCCAGATACGGCATCGCCTGGGGCGTGCTGGGAGCCTCTGAGTTCTGCCTGCACACCGC

CAGGCAGTACGCCCTGGATAGGATGCAGTTTGGCGTGCCCCTGGCCAGAAACCAGCTGATCCAGAAG

AAGCTGGCCGACATGCTGACCGAGATCACACTGGGCCTGCACGCCTGCCTGCAGCTGGGAAGGCTGA

AGGATCAGGACAAGGCCGCCCCCGAGATGGTGTCCCTGCTGAAGAGAAATAATTGTGGCAAGGCCCT

GGACATCGCCAGACAGGCCAGAGATATGCTGGGCGGCAATGGCATCAGCGATGAGTACCACGTGATC

AGGCACGCCATGAACCTGGAGGCCGTGAACACCTACGAGGGCACCCACGACATCCACGCCCTGATCC

TGGGCAGGGCCATCACCGGCATCCAGGCCTTTACCGCCAGCAAGTAA

>C5
(SEQ ID NO: 15)
ATGGCCCTGAGAGGCGTCTCCGTGCGGCTGCTGAGCCGCGGACCCGGCCTGCACGTCCTTCGCACGT

GGGTCTCGTCGGCGGCGCAGACCGAGAAAGGCGGGAGAACACAGAGCCAACTGGCTAAGTCCTCGA

GACCCGAGTTCGACTGGCAGGACCCTCTTGTGCTGGAAGAGCAACTGACAACAGATGAGATCCTGAT

CAGAGACACCTTCAGAACCTACTGCCAGGAGAGACTGATGCCCAGAATCCTGCTGGCCAACAGAAA

CGAGGTGTTCCACAGAGAGATCATCAGCGAGATGGGCGAGCTGGGCGTGCTGGGCCCTACAATTAAA

GGATATGGCTGCGCCGGAGTGAGCAGCGTGGCTTATGGACTTCTGGCTAGAGAGCTGGAGAGAGTGG

ACAGCGGCTATAGAAGCGCCATGAGCGTGCAGAGCAGCCTGGTGATGCATCCCATTTATGCCTACGGC

AGCGAGGAGCAAAGACAGAAGTACCTGCCCCAGCTGGCCAAGGGCGAGCTGCTGGGATGTTTTGGA

CTTACAGAACCCAACAGCGGAAGCGACCCCAGCAGCATGGAAACCAGAGCTCATTATAACAGCAGCA

ACAAGAGCTACACCCTGAACGGCACCAAGACCTGGATCACCAACAGCCCCATGGCCGACCTTTTTGT

GGTGTGGGCTAGATGCGAGGACGGCTGTATTAGAGGCTTTCTGCTGGAAAAGGGCATGAGAGGCCTG

AGCGCCCCTAGAATTCAAGGCAAATTTAGCCTGAGAGCCAGCGCCACCGGAATGATTATCATGGACGG

CGTGGAGGTGCCCGAGGAGAATGTGCTGCCTGGAGCTAGCAGCCTGGGAGGCCCTTTTGGATGTCTG

AATAATGCCAGATACGGCATCGCCTGGGGCGTGCTGGGAGCTAGCGAGTTTTGTCTGCATACAGCCAG

ACAGTACGCCCTGGACAGAATGCAGTTCGGCGTGCCCCTTGCTAGAAATCAGCTGATCCAGAAGAAG

CTGGCCGACATGCTGACCGAGATCACCCTGGGACTTCACGCCTGTCTGCAACTGGGAAGACTGAAAG

ATCAGGACAAGGCCGCCCCCGAAATGGTGTCTCTGCTTAAAAGAAACAACTGCGGCAAGGCCCTGG

-continued

ACATCGCCAGACAAGCTAGAGATATGCTGGGCGGCAATGGCATTAGCGATGAATATCACGTGATTAGA

CACGCCATGAACCTGGAGGCCGTGAACACCTATGAGGGCACACATGACATCCACGCCCTGATTCTGG

GAAGAGCCATTACCGGCATCCAGGCCTTTACCGCCAGCAAGTAA

>C6
(SEQ ID NO: 16)
ATGGCCCTGAGAGGCGTCTCCGTGCGGCTGCTGAGCCGCGGACCCGGCCTGCACGTCCTTCGCACGT

GGGTCTCGTCGGCGGCGCAGACCGAGAAAGGCGGGAGAACACAGAGCCAACTGGCTAAGTCCTCGC

GTCCCGAGTTTGACTGGCAGGACCCGCTGGTGCTGGAGGAGCAGCTGACCACAGATGAGATCCTCAT

CAGGGACACCTTCCGCACCTACTGCCAGGAGAGACTCATGCCTCGCATCCTGTTGGCCAATCGCAAC

GAAGTTTTTCATCGGGAGATCATTTCGGAGATGGGGGAGTTGGGTGTGCTGGGCCCCACCATCAAAG

GATATGGCTGTGCTGGGGTTTCGTCTGTGGCCTATGGGCTCCTGGCCCGAGAGCTGGAGCGGGTGGAC

AGTGGCTACAGGTCGGCGATGAGTGTCCAGTCCTCCCTCGTCATGCACCCTATCTATGCCTATGGCAGC

GAGGAACAGCGGCAGAAGTACCTGCCCCAGCTGGCCAAGGGGGAGCTCCTGGGCTGCTTTGGGCTC

ACAGAGCCCAACTCTGGAAGTGACCCCAGCAGCATGGAGACCAGAGCCCACTACAACTCATCCAAC

AAGAGCTACACCCTCAATGGGACCAAGACCTGGATCACGAACTCGCCTATGGCCGATCTGTTTGTAGT

GTGGGCTAGGTGTGAAGATGGCTGCATTAGGGGCTTCCTGCTGGAGAAGGGGATGAGGGGTCTCTCG

GCCCCCAGGATCCAGGGCAAGTTCTCGCTGAGGGCCTCAGCCACAGGCATGATCATCATGGATGGTGT

GGAGGTGCCAGAGGAGAATGTGCTCCCTGGTGCATCCAGCCTGGGGGTCCCTTTGGCTGCCTGAAC

AATGCCAGGTATGGCATTGCGTGGGCGTGCTTGGAGCTTCGGAGTTCTGCTTGCACACAGCCAGGC

AGTATGCCCTTGACAGGATGCAGTTTGGTGTCCCACTGGCCAGGAACCAGCTGATTCAGAAGAAGCT

GGCAGACATGCTCACTGAGATTACCCTGGGCCTTCATGCCTGCCTGCAGCTTGGCAGATTGAAGGACC

AGGACAAGGCTGCCCCTGAGATGGTTTCTCTGCTGAAGAGGAATAACTGTGGGAAAGCCCTGGACAT

TGCCAGACAGGCCCGAGACATGCTGGGGGGGAATGGGATTTCTGATGAGTATCATGTGATCAGGCATG

CCATGAACCTGGAGGCCGTGAACACCTATGAAGGTACACATGACATTCATGCCCTGATCCTTGGGAGA

GCTATCACGGGAATCCAGGCGTTCACGGCCAGCAAGTAA

>C7
(SEQ ID NO: 17)
ATGGCCCTGAGAGGCGTCTCCGTGCGGCTGCTGAGCCGCGGACCCGGCCTGCACGTCCTTCGCACGT

GGGTCTCGTCGGCGGCGCAGACCGAGAAAGGCGGGAGAACACAGAGCCAACTGGCTAAGTCCTCGC

GTCCCGAGTTTGACTGGCAGGACCCGCTGGTGCTGGAGGAGCAGCTGACCACAGATGAGATCCTCAT

CAGGGACACCTTCCGCACCTACTGCCAGGAGAGACTCATGCCTCGCATCCTGTTGGCCAATCGCAAC

GAAGTTTTTCATCGGGAGATCATTTCGGAGATGGGGGAGTTGGGTGTGCTGGGCCCCACCATCAAAG

GATATGGCTGTGCTGGGGTTTCGTCTGTGGCCTATGGGCTCCTGGCCCGAGAGCTGGAGCGGGTGGAC

AGTGGCTACAGGTCGGCGATGAGTGTCCAGTCCTCCCTCGTCATGCACCCTATCTATGCCTATGGCAGC

GAGGAACAGCGGCAGAAGTACCTGCCCCAGCTGGCCAAGGGGGAGCTCCTGGGCTGCTTTGGCCTC

ACTGAGCCAAATTCTGGTTCAGACCCATCATCTATGGAAACAAGGGCCCATTACAATTCATCTAATAAG

TCATACACTCTGAATGGTACTAAGACCTGGATCACCAACTCTCCAATGGCAGACCTGTTTGTAGTTTGG

GCAAGATGTGAAGATGGCTGTATTAGGGGTTTCCTCCTGGAGAAGGGCATGAGAGGTCTCTCTGCACC

AAGGATTCAGGGAAAATTCTCTCTGAGAGCTTCTGCTACAGGCATGATTATTATGGATGGGGTGGAGG

TTCCTGAAGAGAATGTCCTGCCTGGAGCTTCATCACTGGGGGCCCCTTTGGCTGTCTGAACAATGCC

AGATATGGTATTGCATGGGGGGTTCTGGGGGCTAGTGAGTTCTGCCTGCACACAGCTAGACAGTATGC

TCTGGATAGGATGCAGTTTGGTGTTCCTCTGGCTAGGAACCAGCTGATTCAGAAAAAACTGGCTGATA

TGCTCACAGAGATTACACTGGGTCTGCATGCTTGTCTCCAGCTGGGTAGACTCAAAGATCAGGATAAG

-continued

```
GCTGCTCCAGAAATGGTGTCACTCCTGAAGAGGAATAACTGTGGCAAGGCTCTGGACATTGCTAGAC

AGGCTAGGGATATGCTGGGTGGTAATGGCATCTCAGATGAATATCATGTTATTAGACATGCCATGAATCT

GGAGGCTGTTAACACTTATGAAGGCACACATGATATTCATGCCCTCATCCTGGGGAGAGCTATTACAG

GTATTCAGGCCTTTACTGCTTCTAAGTGA
```

>C8
(SEQ ID NO: 18)
```
ATGGCCCTGAGAGGCGTCTCCGTGCGGCTGCTGAGCCGCGGACCCGGCCTGCACGTCCTTCGCACGT

GGGTCTCGTCGGCGGCGCAGACCGAGAAAGGCGGGAGAACACAGAGCCAACTGGCTAAGTCCTCGC

GTCCCGAGTTTGACTGGCAGGACCCGCTGGTGCTGGAGGAGCAGCTGACCACAGATGAGATCCTCAT

CAGGGACACCTTCCGCACCTACTGCCAGGAGAGACTCATGCCTCGCATCCTGTTGGCCAATCGCAAC

GAAGTTTTTCATCGGGAGATCATTTCGGAGATGGGGGAGTTGGGTGTGCTGGGCCCCACCATCAAAG

GATATGGCTGTGCTGGGGTTTCGTCTGTGGCCTATGGGCTCCTGGCCCGAGAGCTGGAGCGGGTGGAC

AGTGGCTACAGGTCGGCGATGAGTGTCCAGTCCTCCCTCGTCATGCACCCTATCTATGCCTATGGCAGC

GAGGAACAGCGGCAGAAGTACCTGCCCCAGCTGGCCAAGGGGGAGCTCCTGGGCTGCTTCGGGCTC

ACAGAGCCCAACAGCGGAAGTGACCCCAGCAGCATGGAGACCAGAGCCCACTACAACTCATCCAAC

AAGAGCTACACCCTCAATGGGACCAAGACCTGGATCACGAACTCGCCTATGGCCGATCTGTTTGTAGT

GTGGGCTCGGTGTGAAGATGGCTGCATTCGGGGCTTCCTGCTGGAGAAGGGGATGCGGGGTCTCTCG

GCCCCCAGGATCCAGGGCAAGTTCTCGCTGCGGGCCTCAGCCACAGGCATGATCATCATGGACGGTG

TGGAGGTGCCAGAGGAGAATGTGCTCCCTGGTGCATCCAGCCTGGGGGGTCCCTTCGGCTGTCTGAA

CAATGCCAGATATGGTATTGCATGGGGGGTTCTGGGGGCTAGTGAGTTCTGCCTGCACACAGCTAGAC

AGTATGCTCTGGATAGGATGCAGTTTGGTGTTCCTCTGGCTAGGAACCAGCTGATTCAGAAAAAACTG

GCTGATATGCTCACAGAGATTACACTGGGTCTGCATGCTTGTCTCCAGCTGGGTAGACTCAAAGATCA

GGATAAGGCTGCTCCAGAAATGGTGTCACTCCTGAAGAGGAATAACTGTGGCAAGGCTCTGGACATT

GCTAGACAGGCTAGGGATATGCTGGGTGGTAATGGCATCTCAGATGAATATCATGTTATTAGACATGCC

ATGAATCTGGAGGCTGTTAACACTTATGAAGGCACACATGATATTCATGCCCTCATCCTGGGGAGAGCT

ATTACAGGTATTCAGGCCTTTACTGCTTCTAAGTGA
```

>V1
(SEQ ID NO: 19)
```
CTGCGCGCTCGCTCGCTCACTGAGGCCGCCCGGGCAAAGCCCGGGCGTCGGGCGACCTTTGGTCGCC

CGGCCTCAGTGAGCGAGCGAGCGCGCAGAGAGGGAGTGGGGTTAAACGTTGACATTGATTATTGCGG

CCTCTAGACTCGAGGCGTTGACATTGATTATTGACTAGTTATTAATAGTAATCAATTACGGGGTCATTAG

TTCATAGCCCATATATGGAGTTCCGCGTTACATAACTTACGGTAAATGGCCCGCCTGGCTGACCGCCCA

ACGACCCCGCCCATTGACGTCAATAATGACGTATGTTCCCATAGTAACGCCAATAGGGACTTTCCATT

GACGTCAATGGGTGGAGTATTTACGGTAAACTGCCCACTTGGCAGTACATCAAGTGTATCATATGCCAA

GTACGCCCCCTATTGACGTCAATGACGGTAAATGGCCCGCCTGGCATTATGCCCAGTACATGACCTTAT

GGGACTTTCCTACTTGGCAGTACATCTACGTATTAGTCATCGCTATTACCATGGTGATGCGGTTTTGGCA

GTACATCAATGGGCGTGGATAGCGGTTTGACTCACGGGGATTTCCAAGTCTCCACCCCATTGACGTCA

ATGGGAGTTTGTTTTGGCACCAAAATCAACGGGACTTTCCAAAATGTCGTAACAACTCCGCCCCATTG

ACGCAAATGGGCGGTAGGCGTGTACGGTGGGAGGTCTATATAAGCAGAGCTAAGCTTGCCGCCACCAT

GGCCCTGAGAGGCGTCTCCGTGCGGCTGCTGAGCCGCGGACCCGGCCTGCACGTCCTTCGCACGTGG

GTCTCGTCGGCGGCGCAGACCGAGAAAGGCGGGAGAACACAGAGCCAACTGGCTAAGTCCTCGCGT

CCCGAGTTTGACTGGCAGGACCCGCTGGTGCTGGAGGAGCAGCTGACCACAGATGAGATCCTCATCA
```

-continued

GGGACACCTTCCGCACCTACTGCCAGGAGAGACTCATGCCTCGCATCCTGTTGGCCAATCGCAACGA

AGTTTTTCATCGGGAGATCATTTCGGAGATGGGGGAGTTGGGTGTGCTGGGCCCCACCATCAAAGGAT

ATGGCTGTGCTGGGGTTTCGTCTGTGGCCTATGGGCTCCTGGCCCGAGAGCTGGAGCGGGTGGACAG

TGGCTACAGGTCGGCGATGAGTGTCCAGTCCTCCCTCGTCATGCACCCTATCTATGCCTATGGCAGCGA

GGAACAGCGGCAGAAGTACCTGCCCCAGCTGGCCAAGGGGGAGCTCCTGGGCTGCTTCGGGCTCAC

AGAGCCCAACAGCGGAAGTGACCCCAGCAGCATGGAGACCAGAGCCCACTACAACTCATCCAACAA

GAGCTACACCCTCAATGGGACCAAGACCTGGATCACGAACTCGCCTATGGCCGATCTGTTTGTAGTGT

GGGCTCGGTGTGAAGATGGCTGCATTCGGGGCTTCCTGCTGGAGAAGGGGATGCGGGGTCTCTCGGC

CCCCAGGATCCAGGGCAAGTTCTCGCTGCGGGCCTCAGCCACAGGCATGATCATCATGGACGGTGTG

GAGGTGCCAGAGGAGAATGTGCTCCCTGGTGCATCCAGCCTGGGGGGTCCCTTCGGCTGCCTGAACA

ACGCCCGGTACGGCATCGCGTGGGGCGTGCTTGGAGCTTCGGAGTTCTGCTTGCACACAGCCCGGCA

GTACGCCCTCGACAGGATGCAGTTTGGTGTCCCACTGGCCAGGAACCAGCTGATTCAGAAGAAGCTG

GCAGACATGCTCACTGAGATTACCCTGGGCCTTCACGCCTGCCTGCAGCTCGGCCGCTTGAAGGACC

AGGACAAGGCTGCCCCCGAGATGGTTTCTCTGCTGAAGAGGAATAACTGTGGGAAAGCCCTGGACAT

CGCCCGCCAGGCCCGAGACATGCTGGGGGGGAATGGGATTTCTGACGAGTATCACGTGATCCGGCAC

GCCATGAACCTGGAGGCCGTGAACACCTACGAAGGTACACATGACATTCACGCCCTGATCCTTGGGA

GAGCTATCACGGGAATCCAGGCGTTCACGGCCAGCAAGTAAGAATTCCAGACATGATAAGATACATTG

ATGAGTTTGGACAAACCACAACTAGAATGCAGTGAAAAAAATGCTTTATTTGTGAAATTTGTGATGCT

ATTGCTTTATTTGTAACCATTATAAGCTGCAATAAACAAGTTAACAACAACAATTGCATTCATTTTATGT

TTCAGGTTCAGGGGGAGGTGTGGGAGGTTTTTTCGTTACTAGAGCATGGCTACGTAGATAAGTAGCAT

GGCGGGTTAATCATTAACTACAAGGAACCCCTAGTGATGGAGTTGGCCACTCCCTCTCTGCGCGCTCG

CTCGCTCACTGAGGCCGGGCGACCAAAGGTCGCCCGACGCCCGGGCTTTGCCCGGGCGGCCTCAGT

GAGCGAGCGAGCGCGCAG

>V2
(SEQ ID NO: 20)
CTGCGCGCTCGCTCGCTCACTGAGGCCGCCCGGGCAAAGCCCGGGCGTCGGGCGACCTTTGGTCGCC

CGGCCTCAGTGAGCGAGCGAGCGCGCAGAGAGGGAGTGGGGTTATCTAGACCTAGGACTAGTGGCTC

CGGTGCCCGTCAGTGGGCAGAGCGCACATCGCCCACAGTCCCCGAGAAGTTGGGGGGAGGGGTCGG

CAATTGAACGGGTGCCTAGAGAAGGTGGCGCGGGGTAAACTGGGAAAGTGATGTCGTGTACTGGCTC

CGCCTTTTTCCCGAGGGTGGGGGAGAACCGTATATAAGTGCAGTAGTCGCCGTGAACGTTCTTTTTCG

CAACGGGTTTGCCGCCAGAACACAGGTCAGTGTGGGGTCGGGAGTGTGGAGGGAAGGAGGGAGGA

ACTGGGGGTTTAGGGACTTTCCGGGGTGACTTTCCCGTTCTGTGCTTGCAGAAGCTTGCCGCCACCAT

GGCTCTGAGAGGGGTGAGCGTCAGACTGCTGAGCAGAGGCCCTGGCCTGCATGTGCTGAGAACATG

GGTGTCCAGCGCTGCTCAGACAGAGAAGGGGGGCAGAACACAGAGCCAACTGGCCAAGAGCAGCA

GACCTGAATTTGACTGGCAAGACCCCCTGGTCCTGGAGGAGCAGCTGACCACAGATGAGATCCTGAT

CAGAGACACCTTCAGAACCTACTGCCAAGAGAGACTGATGCCTAGAATCCTGCTGGCCAACAGAAAT

GAGGTCTTCCACAGAGAAATCATTAGCGAGATGGGGGAGCTGGGGGTGCTGGGCCCTACAATCAAGG

GCTATGGCTGTGCTGGGGTGAGCAGCGTGGCCTATGGCCTGCTGGCTAGAGAGCTGGAGAGAGTGGA

CAGCGGGTACAGAAGCGCTATGAGCGTGCAGAGCAGCCTGGTCATGCACCCCATCTATGCCTATGGCA

GCGAGGAGCAGAGACAGAAATATCTCCCTCAGCTGGCCAAGGGGGAGCTGCTGGGCTGCTTTGGCCT

CACAGAGCCCAATAGCGGCAGCGACCCTAGCAGCATGGAGACAAGAGCCCACTACAACAGCAGCAA

CAAGAGCTACACCCTGAATGGCACCAAGACATGGATCACAAACAGCCCCATGGCTGATCTCTTTGTG

-continued

```
GTCTGGGCTAGATGTGAGGATGGCTGTATCAGAGGCTTTCTCCTGGAGAAGGGCATGAGAGGCCTGA

GCGCTCCTAGAATCCAAGGCAAATTCAGCCTCAGAGCTTCCGCCACCGGGATGATCATCATGGATGGG

GTGGAGGTCCCTGAGGAGAATGTGCTGCCTGGGGCTAGCTCCCTGGGGGCCCCCTTTGGCTGTCTCA

ATAATGCTAGATATGGCATTGCCTGGGGGGTGCTGGGGGCCAGCGAGTTCTGCCTGCATACAGCTAGA

CAATATGCCCTGGACAGAATGCAGTTTGGGGTGCCCCTGGCTAGAAATCAGCTGATTCAGAAGAAGCT

GGCTGACATGCTGACAGAGATCACACTGGGCCTGCATGCCTGTCTGCAGCTGGGGAGACTGAAGGAC

CAAGATAAGGCTGCCCCTGAGATGGTGAGCCTGCTGAAGAGAAATAACTGTGGGAAAGCTCTGGACA

TTGCTAGACAAGCTAGAGACATGCTGGGGGGCAATGGCATCTCCGATGAGTACCATGTCATCAGACAT

GCCATGAACCTGGAGGCTGTGAACACCTATGAGGGCACACATGACATCCATGCCCTGATCCTGGGCA

GAGCCATCACCGGCATCCAAGCCTTCACAGCTAGCAAGTGAGAATTCCAGACATGATAAGATACATTG

ATGAGTTTGGACAAACCACAACTAGAATGCAGTGAAAAAAATGCTTTATTTGTGAAATTTGTGATGCT

ATTGCTTTATTTGTAACCATTATAAGCTGCAATAAACAAGTTAACAACAACAATTGCATTCAGGTTAATC

ATTAACTACAAGGAACCCCTAGTGATGGAGTTGGCCACTCCCTCTCTGCGCGCTCGCTCGCTCACTGA

GGCCGGGCGACCAAAGGTCGCCCGACGCCCGGGCTTTGCCCGGGCGGCCTCAGTGAGCGAGCGAGC

GCGCAG
```

>V3
(SEQ ID NO: 21)

```
CTGCGCGCTCGCTCGCTCACTGAGGCCGCCCGGGCAAAGCCCGGGCGTCGGGCGACCTTTGGTCGCC

CGGCCTCAGTGAGCGAGCGAGCGCGCAGAGAGGGAGTGGGGTTATGAATGCAATTGTTGTTGTTAAC

TTGTTTATTGCAGCTTATAATGGTTACAAATAAAGCAATAGCATCACAAATTTCACAAATAAAGCATTTT

TTTCACTGCATTCTAGTTGTGGTTTGTCCAAACTCATCAATGTATCTTATCATGTCTGGAATTCTCACTT

GCTAGCTGTGAAGGCTTGGATGCCGGTGATGGCTCTGCCCAGGATCAGGGCATGGATGTCATGTGTGC

CCTCATAGGTGTTCACAGCCTCCAGGTTCATGGCATGTCTGATGACATGGTACTCATCGGAGATGCCAT

TGCCCCCCAGCATGTCTCTAGCTTGTCTAGCAATGTCCAGAGCTTTCCCACAGTTATTTCTCTTCAGCA

GGCTCACCATCTCAGGGGCAGCCTTATCTTGGTCCTTCAGTCTCCCCAGCTGCAGACAGGCATGCAGG

CCCAGTGTGATCTCTGTCAGCATGTCAGCCAGCTTCTTCTGAATCAGCTGATTTCTAGCCAGGGGCAC

CCCAAACTGCATTCTGTCCAGGGCATATTGTCTAGCTGTATGCAGGCAGAACTCGCTGGCCCCCAGCA

CCCCCCAGGCAATGCCATATCTAGCATTATTGAGACAGCCAAAGGGGCCCCCCAGGGAGCTAGCCCCA

GGCAGCACATTCTCCTCAGGGACCTCCACCCCATCCATGATGATCATCCCGGTGGCGGAAGCTCTGAG

GCTGAATTTGCCTTGGATTCTAGGAGCGCTCAGGCCTCTCATGCCCTTCTCCAGGAGAAAGCCTCTGA

TACAGCCATCCTCACATCTAGCCCAGACCACAAAGAGATCAGCCATGGGGCTGTTTGTGATCCATGTC

TTGGTGCCATTCAGGGTGTAGCTCTTGTTGCTGCTGTTGTAGTGGGCTCTTGTCTCCATGCTGCTAGGG

TCGCTGCCGCTATTGGGCTCTGTGAGGCCAAAGCAGCCCAGCAGCTCCCCCTTGGCCAGCTGAGGGA

GATATTTCTGTCTCTGCTCCTCGCTGCCATAGGCATAGATGGGGTGCATGACCAGGCTGCTCTGCACGC

TCATAGCGCTTCTGTACCCGCTGTCCACTCTCTCCAGCTCTCTAGCCAGCAGGCCATAGGCCACGCTG

CTCACCCCAGCACAGCCATAGCCCTTGATTGTAGGGCCCAGCACCCCAGCTCCCCATCTCGCTAAT

GATTTCTCTGTGGAAGACCTCATTTCTGTTGGCCAGCAGGATTCTAGGCATCAGTCTCTCTTGGCAGTA

GGTTCTGAAGGTGTCTCTGATCAGGATCTCATCTGTGGTCAGCTGCTCCTCCAGGACCAGGGGGTCTT

GCCAGTCAAATTCAGGTCTGCTGCTCTTGGCCAGTTGGCTCTGTGTTCTGCCCCCCTTCTCTGTCTGA

GCAGCGCTGGACACCCATGTTCTCAGCACATGCAGGCCAGGGCCTCTGCTCAGCAGTCTGACGCTCA

CCCCTCTCAGAGCCATGGTGGCGGCAAGCTTCTGAAAAAAAGTGATTTCAGGCAGGTGCTCCAGGTA
```

-continued

ATTAAACATTAATACCCCACCAACCAACCATCCCTTAAACCCTTACCTCTTGCTCAGCTAATTACAGCC

CGGAGGAGAAGGGCCGTCCCGCCCGCTCACCTGTGGGAGTAACGCGGTCAGTCAGAGCGGGGCGG

GCGGCGCGAGGCGGCGGCGGAGCGGGGCACGGGGCGAAGGCAGCGTCGCAGCGACTCCCTGTGTTC

TGGCGGCAAACCCGTTGCGAAAAAGAACGTTCACGGCGACTACTGCACTTATATACGGTTCTCCCCCA

CCCTCGGGAAAAAGGCGGAGCCAGTACACGACATCACTTTCCCAGTTTACCCCGCGCCACCTTCTCTA

GGCACCCGTTCAATTGCCGACCCCTCCCCCCAACTTCTCGGGGACTGTGGGCGATGTGCGCTCTGCCC

ACTGACGGGCACCGGAGCCACTAGTCCTAGGTCTAGAGGTTAATCATTAACTACAAGGAACCCCTAGT

GATGGAGTTGGCCACTCCCTCTCTGCGCGCTCGCTCGCTCACTGAGGCCGGGCGACCAAAGGTCGCC

CGACGCCCGGGCTTTGCCCGGGCGGCCTCAGTGAGCGAGCGAGCGCGCAG

>L-ITR
                                                           (SEQ ID NO: 22)
CTGCGCGCTCGCTCGCTCACTGAGGCCGCCCGGGCAAAGCCCGGGCGTCGGGCGACCTTTGGTCGCC

CGGCCTCAGTGAGCGAGCGAGCGCGCAGAGAGGGAGTGG

>R-ITR
                                                           (SEQ ID NO: 23)
AGGAACCCCTAGTGATGGAGTTGGCCACTCCCTCTCTGCGCGCTCGCTCGCTCACTGAGGCCGGGCG

ACCAAAGGTCGCCCGACGCCCGGGCTTTGCCCGGGCGGCCTCAGTGAGCGAGCGAGCGCGCAG

>CMV ENHANCER
                                                           (SEQ ID NO: 24)
GACATTGATTATTGACTAGTTATTAATAGTAATCAATTACGGGGTCATTAGTTCATAGCCCATATATGGAG

TTCCGCGTTACATAACTTACGGTAAATGGCCCGCCTGGCTGACCGCCCAACGACCCCCGCCCATTGAC

GTCAATAATGACGTATGTTCCCATAGTAACGCCAATAGGGACTTTCCATTGACGTCAATGGGTGGAGTA

TTTACGGTAAACTGCCCACTTGGCAGTACATCAAGTGTATCATATGCCAAGTACGCCCCCTATTGACGT

CAATGACGGTAAATGGCCCGCCTGGCATTATGCCCAGTACATGACCTTATGGGACTTTCCTACTTGGCA

GTACATCTACGTATTAGTCATCGCTATTACCATG

>CMV PROMOTER
                                                           (SEQ ID NO: 25)
GTGATGCGGTTTTGGCAGTACATCAATGGGCGTGGATAGCGGTTTGACTCACGGGGATTTCCAAGTCT

CCACCCCATTGACGTCAATGGGAGTTTGTTTTGGCACCAAAATCAACGGGACTTTCCAAAATGTCGTA

ACAACTCCGCCCCATTGACGCAAATGGGCGGTAGGCGTGTACGGTGGGAGGTCTATATAAGCAGAGC

T

>CHICKEN B-ACTIN PROMOTER
                                                           (SEQ ID NO: 26)
TCGAGGTGAGCCCCACGTTCTGCTTCACTCTCCCCATCTCCCCCCCCTCCCCACCCCCAATTTTGTATT

TATTTATTTTTTAATTATTTTGTGCAGCGATGGGGGCGGGGGGGGGGGGGGGGCGCGCGCCAGGCGGG

GCGGGGCGGGGCGAGGGGCGGGGGGGGCGAGGCGGAGAGGTGCGGCGGCAGCCAATCAGAGCGG

CGCGCTCCGAAAGTTTCCTTTTATGGCGAGGCGGCGGCGGCGGCGGCCCTATAAAAAGCGAAGCGCG

CGGCGGGCG

>HGCDH INTRON 1
                                                           (SEQ ID NO: 27)
GTCAGTGTGGGGTCGGGAGTGTGGAGGGAAGGAGGGAGGAACTGGGGGTTTAGGGACTTTCCGGGG

TGACTTTCCCGTTCTGTGCTTGCAG

>SV40 INTRON
                                                           (SEQ ID NO: 28)
GTAAGTTTAGTCTTTTTGTCTTTTATTTCAGGTCCCGGATCCGGTGGTGGTGCAAATCAAAGAACTGCT

CCTCAGTGGATGTTGCCTTTACTTCTAG

-continued

>EF-1A CORE PROMOTER
(SEQ ID NO: 29)
GGCTCCGGTGCCCGTCAGTGGGCAGAGCGCACATCGCCCACAGTCCCCGAGAAGTTGGGGGGAGGG

GTCGGCAATTGAACCGGTGCCTAGAGAAGGTGGCGCGGGGTAAACTGGGAAAGTGATGTCGTGTACT

GGCTCCGCCTTTTTCCCGAGGGTGGGGGAGAACCGTATATAAGTGCAGTAGTCGCCGTGAACGTTCTT

TTTCGCAACGGGTTTGCCGCCAGAACACAG

>HGCDH INTRON 2
(SEQ ID NO: 30)
GTAAGGACCTCTGGTCGCACCGTGTGTCTGCTGCCCCTGTTCAGCTGTCTGTCTGCCGCAGGTGGACT

CTGTCCCAGAATCCGAGAGCTGCCCGAGCGGGGTGGCAGGGTCGTGGCCAGGGTCAGAGGCACTAA

GGCAGTGAGTGCGCTGTGCCTGCGGGGCCGGAGAAAAGTCACCTGATCAGTCTCGCTTGCAGCTCGC

ACTAGCCGGGGGGCGACATGGGTGTTGGGGGGTAGGGCTGATGAGGGTCCGAGAAGGGAGGGCACA

GTGATCTTGCGGACTGGACCGAGGCGAATTCCCCTTCCCAG

>HGCDH INTRON 3
(SEQ ID NO: 31)
GTGGGCGGGCTGGTGGGTGCCCTGAGACTGCTCCTCCGCCTGGAGCCATAGCCACCCCACCTCAAGG

CCCCTCTGTCCTTGGGGCTGGGGCTTCCTGTGGCCTAGGCCTGGGCCTGAATTTGGGCACTGGTCCCT

TTGCAG

>HYBRID INTRON
(SEQ ID NO: 32)
GGAGTCGCTGCGACGCTGCCTTCGCCCCGTGCCCCGCTCCGCCGCCGCCTCGCGCCGCCCGCCCCGG

CTCTGACTGACCGCGTTACTCCCACAGGTGAGCGGGCGGGACGGCCCTTCTCCTCCGGGCTGTAATTA

GCTGAGCAAGAGGTAAGGGTTTAAGGGATGGTTGGTTGGTGGGGTATTAATGTTTAATTACCTGGAGC

ACCTGCCTGAAATCACTTTTTTTCAG

>GCDH PROT
(SEQ ID NO: 33)
MALRGVSVRLLSRGPGLHVLRTWVSSAAQTEKGGRTQSQLAKSSRPEFDWQDPLVLEEQLTTDEILIRDT

FRTYCQERLMPRILLANRNEVFHREIISEMGELGVLGPTIKGYGCAGVSSVAYGLLARELERVDSGYRSAM

SVQSSLVMHPIYAYGSEEQRQKYLPQLAKGELLGCFGLTEPNSGSDPSSMETRAHYNSSNKSYTLNGTKT

WITNSPMADLFVVWARCEDGCIRGFLLEKGMRGLSAPRIQGKFSLRASATGMIIMDGVEVPEENVLPGAS

SLGGPFGCLNNARYGIAWGVLGASEFCLHTARQYALDRMQFGVPLARNQLIQKKLADMLTEITLGLHAC

LQLGRLKDQDKAAPEMVSLLKRNNCGKALDIARQARDMLGGNGISDEYHVIRHAMNLEAVNTYEGTH

DIHALILGRAITGIQAFTASK*

---

The invention claimed is:

1. An expression cassette comprising an isolated nucleic acid molecule and a promoter component,
wherein the isolated nucleic acid molecule comprises a nucleotide sequence selected from a group of sequences consisting of SEQ ID NOs: 11-18, wherein the nucleotide sequence encodes human glutaryl-CoA dehydrogenase (hGCDH) polypeptide having an amino acid sequence as shown in SEQ ID NO: 33,
wherein the promoter component is operatively linked to the 5' of the nucleotide sequence encoding the hGCDH polypeptide,
wherein the promoter component comprises
(a) a constitutive promoter, and
(b) one of the followings:
(b1) an enhancer and an intron-derived fragment, or
(b2) an intron-derived fragment;
wherein the intron-derived fragment originates from the intron of SV40, or consists of one or more fragments derived from one or more intronic regions of the human GCDH gene, or is a hybrid intron
wherein the intron-derived fragment has a nucleotide sequence as shown in any of SEQ ID NO: 27, SEQ ID NO: 28, SEQ ID NO: 30, SEQ ID NO: 31 or SEQ ID NO: 32.

2. The expression cassette of claim 1, wherein is a CMV promoter having the nucleotide sequence as shown in SEQ ID NO: 25, a CBA promoter having the nucleotide sequence as shown in SEQ ID NO: 26, or a human elongation factor-1 alpha (EF-1α) core promoter having the nucleotide sequence as shown in SEQ ID NO: 29.

3. The expression cassette of claim 1, wherein the enhancer is a CMV enhancer having a nucleotide sequence as shown in SEQ ID NO: 24.

4. The expression cassette of claim 3, wherein the intron-derived fragment comprises or consists of any two or three nucleotide sequences selected from the nucleotide sequence as shown in any of SEQ ID NO: 27, 30 and 31.

5. The expression cassette of claim 1, wherein the promoter component comprises or consists of a nucleotide sequence as shown in any one of SEQ ID NOS: 2-9.

6. The expression cassette of claim 1, wherein the expression cassette comprises or consists of a nucleotide sequence as shown in SEQ ID NO: 20 or SEQ ID NO: 21.

7. A rAAV vector comprising the nucleic acid molecule of claim 1.

8. The rAAV vector of claim 7, further comprising two AAV inverted terminal repeat (ITRs), wherein the 5' ITR has a nucleotide sequence of SEQ ID NO: 22 and the 3' ITR has a nucleotide sequence of SEQ ID NO: 23.

9. A viral particle comprising the rAAV vector of claim 7 packaged into an AAV capsid.

10. The viral particle of claim 9, wherein the capsid has CNS tropism.

11. The viral particle of claim 10, wherein the capsid is AAV9 or AAV PHP.B capsid.

12. A pharmaceutical composition comprising the rAAV vectors of claim 7, and a pharmaceutically acceptable excipient.

* * * * *